May 16, 1967 J. P. FIORE 3,319,556
COLOR TUBE COATING APPARATUS
Filed Aug. 25, 1964 13 Sheets-Sheet 1

INVENTOR.
Joseph P. Fiore
BY
Francis W. Crotty
Atty.

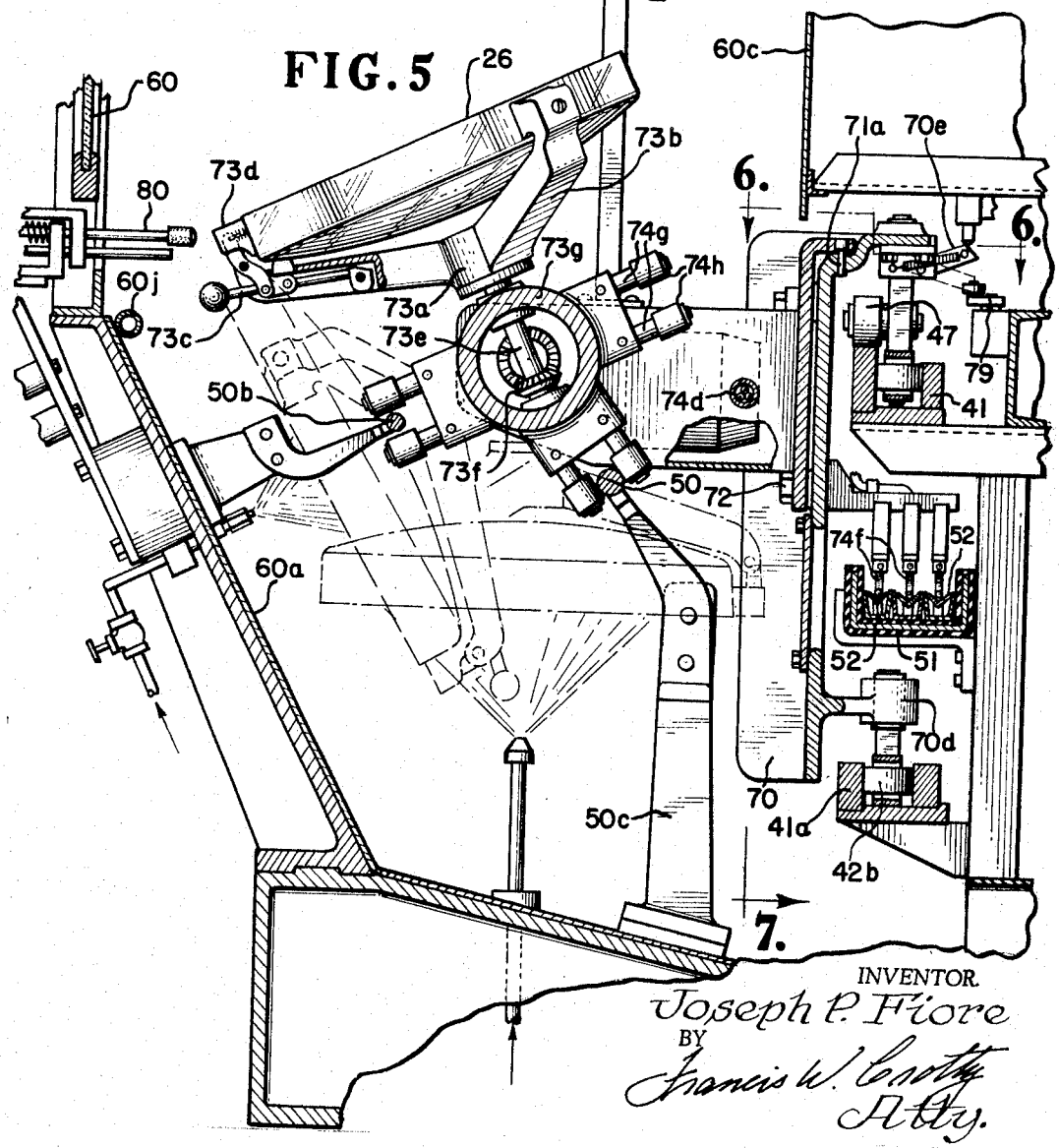

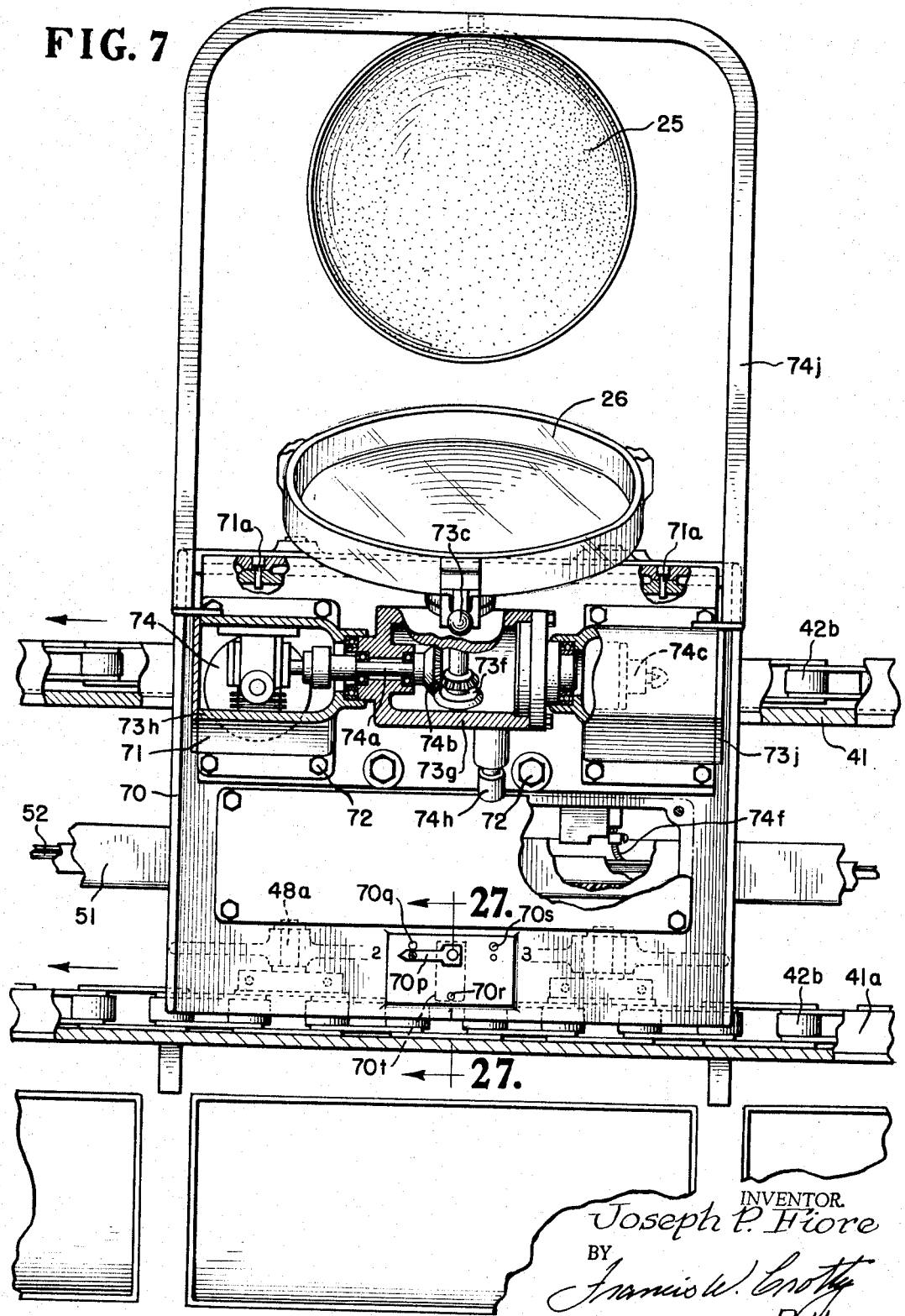

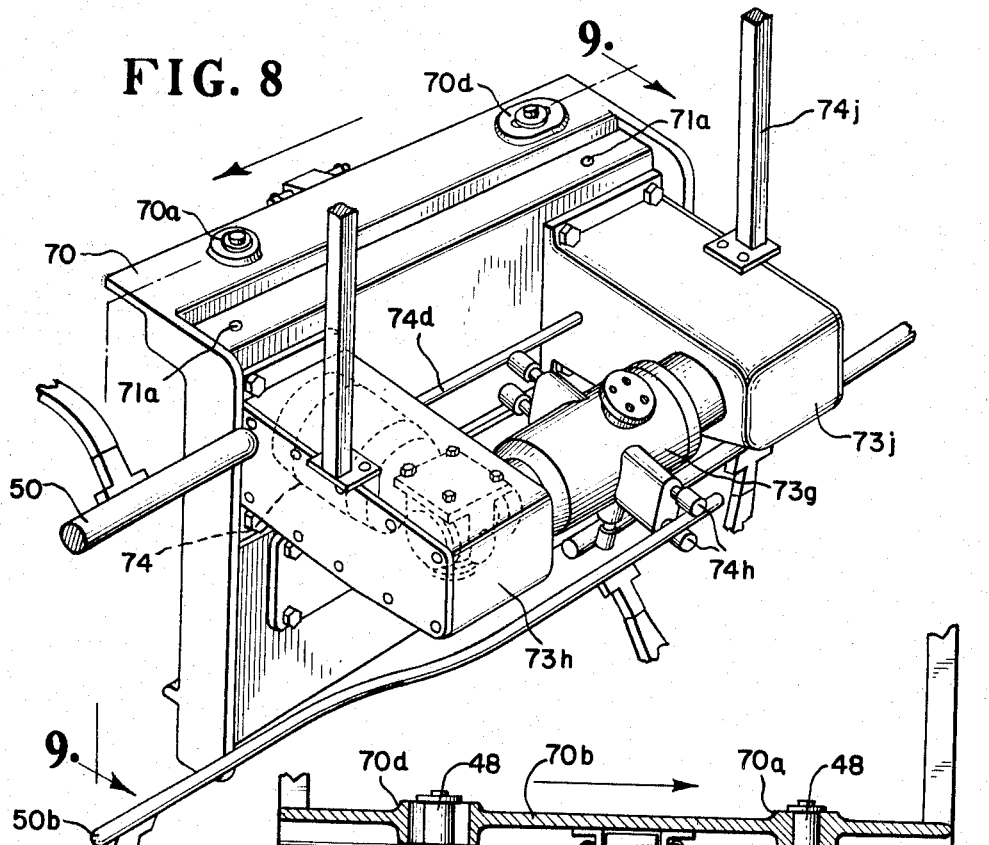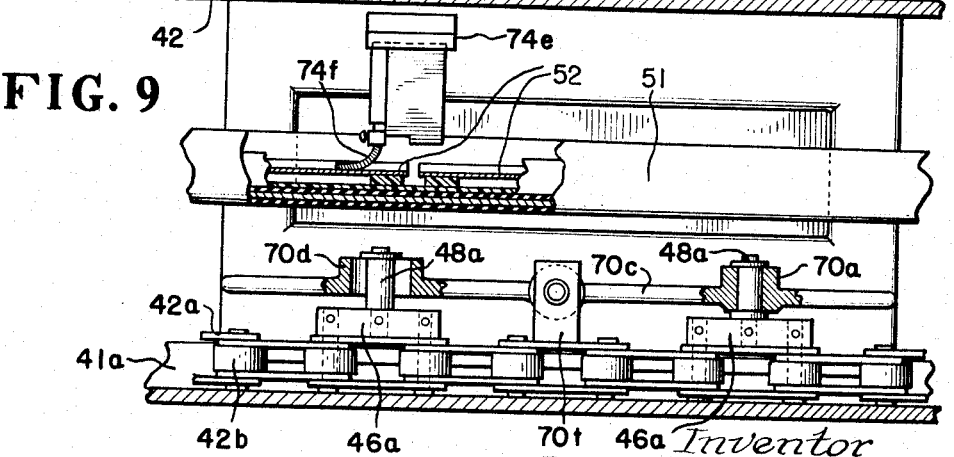

May 16, 1967          J. P. FIORE          3,319,556
COLOR TUBE COATING APPARATUS
Filed Aug. 25, 1964          13 Sheets-Sheet 7

INVENTOR.
Joseph P. Fiore
BY Francis W. Crotty
Atty.

May 16, 1967 J. P. FIORE 3,319,556
COLOR TUBE COATING APPARATUS
Filed Aug. 25, 1964 13 Sheets-Sheet 8

INVENTOR.
Joseph P. Fiore
BY
Francis W. Crotty
Atty.

May 16, 1967 — J. P. FIORE — 3,319,556
COLOR TUBE COATING APPARATUS
Filed Aug. 25, 1964 — 13 Sheets-Sheet 9

INVENTOR.
Joseph P. Fiore

May 16, 1967  J. P. FIORE  3,319,556
COLOR TUBE COATING APPARATUS
Filed Aug. 25, 1964  13 Sheets-Sheet 10

INVENTOR.
Joseph P. Fiore
BY
Francis W. Crotty
Atty.

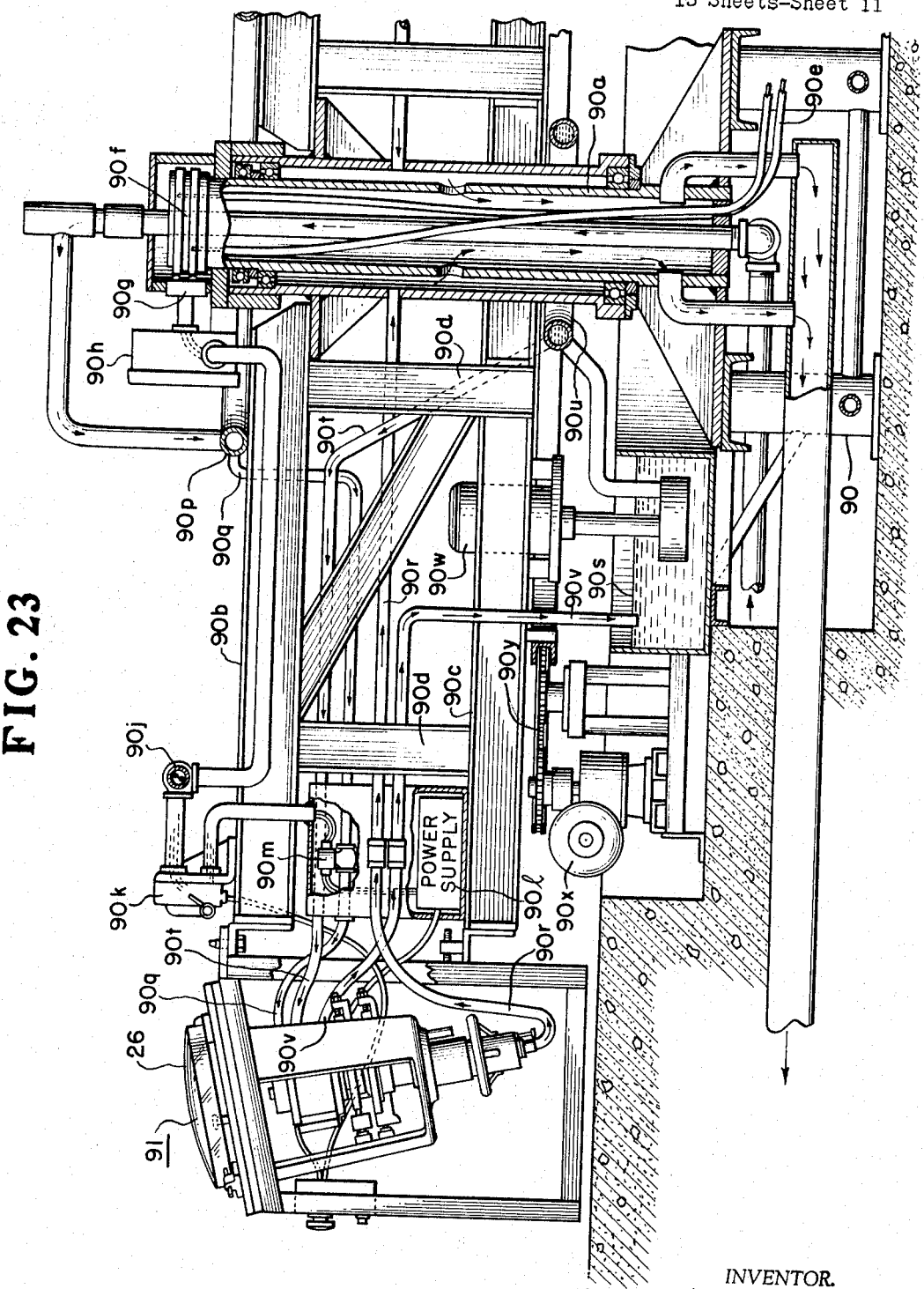

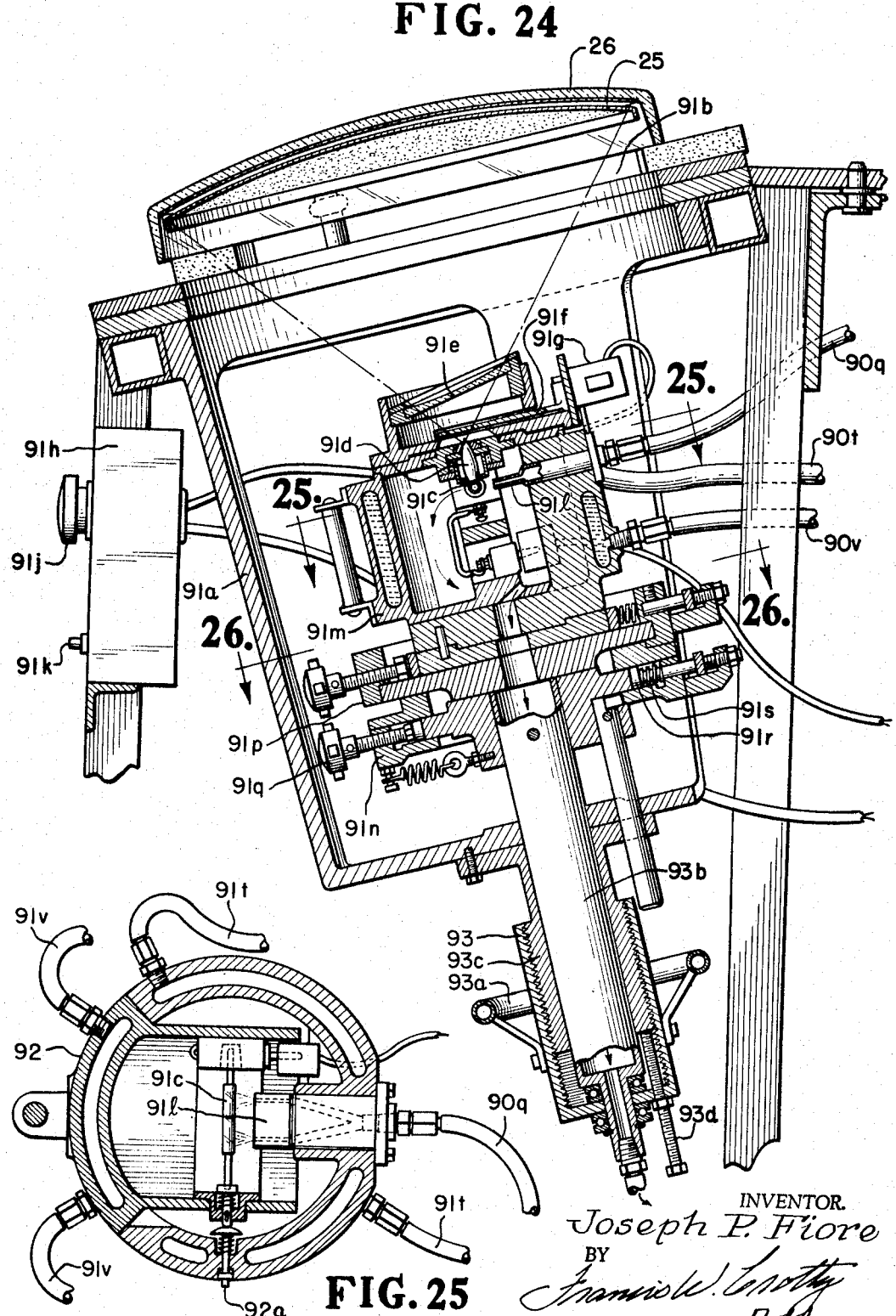

INVENTOR.
Joseph P. Fiore
BY

United States Patent Office 3,319,556
Patented May 16, 1967

3,319,556
COLOR TUBE COATING APPARATUS
Joseph P. Fiore, Wheeling, Ill., assignor to The Rauland Corporation, Chicago, Ill., a corporation of Illinois
Filed Aug. 25, 1964, Ser. No. 391,864
16 Claims. (Cl. 95—73)

The present invention is directed to apparatus for screening a cathode-ray tube and concerns, most particularly, highly automated machinery for fabricating the screen section of a color tube.

Cathode-ray tubes for use in color television as presently contemplated employ the additive type of color process in which information representative of the three primary color fields of an image is employed in synthesizing an image is simulated natural color. To that end, the screen of the cathode-ray tube bears three different groups of phosphor components each of which, when excited by an impinging cathode-ray beam, emits light of one of the primary colors. These components are systematically arranged in an interlaced pattern on the screen and are selectively energized by elecrtons projected through a shadow mask, deflection grid or other selective mechanism so that each contributes the information of its particular color field to the resulting image. One popular form of such device employs circular phosphor elements referred to as dots and their interlacing establishes clusters or triads over the screen with the elements of each triad representing the three primary colors.

It has long been known how to fabricate devices of this type, even where the phosphor elements are small islands or dots, in the laboratory and in semi-automated production plants and it has been proposed and attempts made more fully to accomplish automation. The present invention advances this objective with a processing technique that achieves heretofore unattainable degrees of control and automation especially suited for the manufacture of the dot type shadow mask color tube.

One of the most sensitive areas in the production of that tube is the screening process. Such screens are most susceptible to damage and rejection where dirt in the atmosphere or foreign matter from any other source may reach the screen section during its processing, resulting in contamination.

Also the dependance of the screening process on stability in the many parameters involved poses further difficulties in efforts to accomplish complete automation. The invention here described, in conjunction with other implementing inventive contributions, has made possible a most efficient and reliable plant for the manufacture of color cathode-ray tubes. The portions of the apparatus to be described which represent such further contributions will be identified by reference to concurrently filed applications in the appropriate portions of the text.

It is a specific object of the invention to provide a new and improved apparatus for screening a cathode-ray tube for the reproduction of imabes in simulated natural color.

It is another particular object of the invention to provide a more fully automated screening apparatus for the manufacture of color television tubes.

Finally, it is an object of the invention to provide screening apparatus for color tubes which attains a high degree of efficiency through automation.

Apparatus constructed in accordance with the invention for applying a phosphor coating to the screen section of a color television tube comprises a first endless conveyor having a series of workholders for individually supporting a screen section of a color television tube and for transporting the screen section from a loading station through a multiplicity of screen processing stations ultimately to a discharge station. Coating apparatus at one of these processing stations deposits on the screen section of the tube a coating of photosensitive material and phosphor material. There is a second endless conveyor which has a series of light exposure housings for individually supporting and selectively exposing predetermined portions of the coating on the tube screen section while transporting the screen section from a loading station that is in close proximity to the discharge station of the first conveyor to a discharge station of the second conveyor. Finally, there is a third endless conveyor, likewise, having a series of workholders for individually supporting the tube screen section and for transporting it from a loading station that is in close proximity to the discharge station of the second conveyor through a multiplicity of screen processing stations and ultimately to a discharge station for the third conveyor. At least one of the processing stations of the third conveyor has apparatus for removing unexposed portions of the coating of the tube screen section.

In its preferred form, the apparatus forms dot triads on the tube screen and includes four screening conveyors arranged in parallel and three lighthouse conveyors, each of which is physically positioned between corresponding end portions of two of the screening conveyors. All of the conveyors are of the closed loop or endless type with the loading and discharging stations essentially adjacent one another in each case. Moreover, the terminal stations of the lighthouse conveyors are in close proximity to the terminal portions of the screening conveyors so that a single operator may load a screening conveyor, unload the same conveyor and also load the adjacent lighthouse conveyor. This minimizes handling of the tube screens and also the number of operators required to accomplish complete screening of the color tube.

The features of the present invention which are believed to be novel are set forth with particularity in the appended claims. The invention, together with further objects and advantages thereof, may best be understood by reference to the following description taken in connection with the acompanying drawings, in the several figures of which like reference numerals identify like elements, and in which:

FIGURE 5 is a partial sectional view taken on section line 5—5 of FIGURE 3 and illustrating a screening cart of the conveyor;

FIGURE 6 is a detail of section 6—6 of FIGURE 5 to show a flag of the screening cart which controls the work function at the various work stations of the conveyor;

FIGURE 7 is a view taken generally as indicated at 7—7 of FIGURE 5, showing partially in section details of the screening cart;

FIGURE 8 is another detail of the screening cart with its workholder removed;

FIGURE 9 is a sectional view taken as indicated at 9—9 of FIGURE 8;

FIGURE 23 is a sectional view of the lighthouse conveyor;

FIGURES 24–26 are detail views of one of the lighthouses, and

In the overall, the illustrated arrangement is an apparatus embodiment of the present invention for applying a phosphor coating to the screen section of a tri-color television tube. It will be convenient to describe the composite layout and operation without details of the various work stations and thereafter consider such details as well as other structural features of the screening complex.

*Composite layout*

Figure 1:
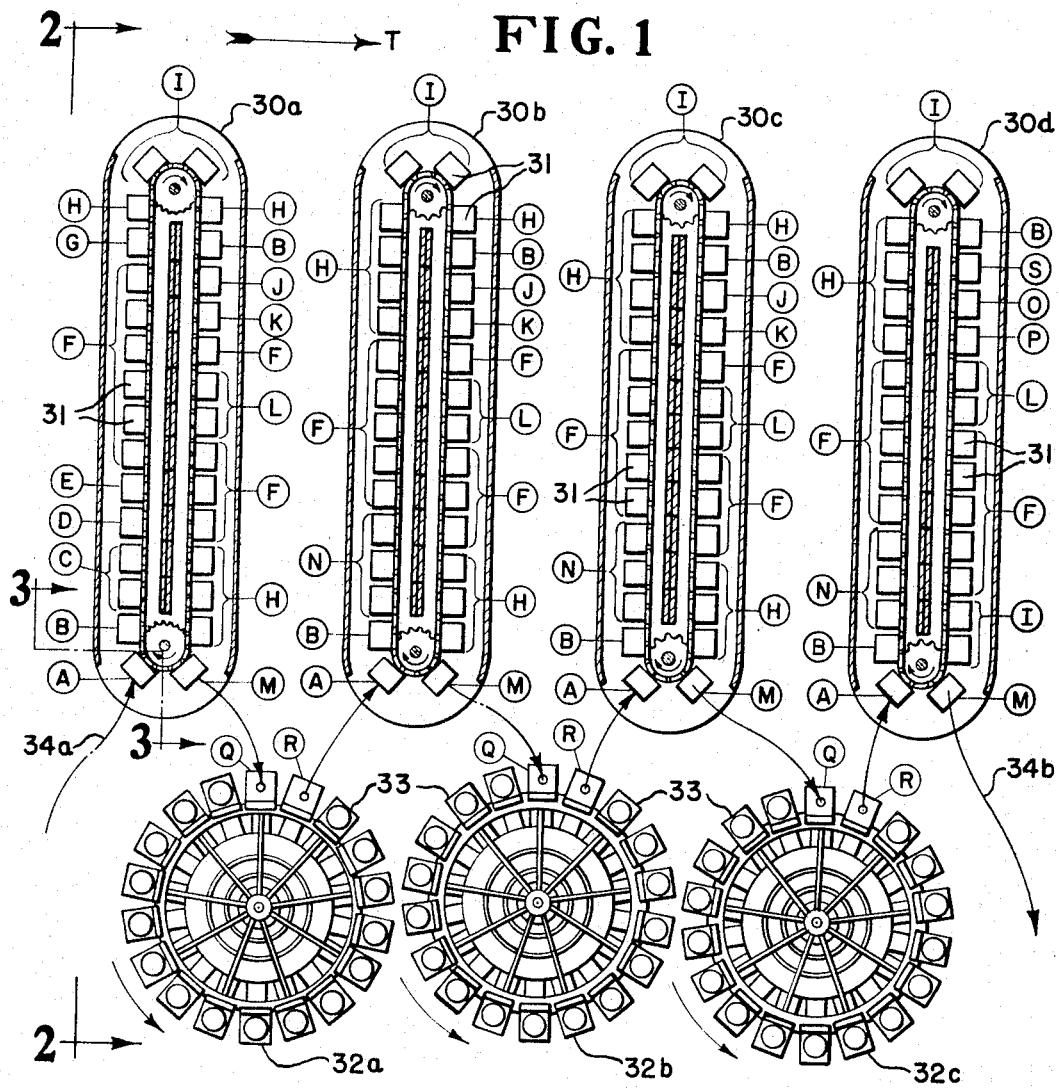
FIGURE 1 is a plan view of a screening layout in accordance with the invention.

Referring to FIGURE 1, the screening apparatus comprises a first group of four very similar endless conveyors 30a, 30b, 30c and 30d, individually in the form of a closed elongated loop and arranged in alignment and with their longitudinal axes in parallel relation with one another. These four are referred to as screening conveyors and, since they are essentially the same, a single description will be given and particular reference will be made to specific conveyors only to the extent that any particular one differs from the other members of its family in structure or in the processes it performs.

Each such conveyor has a series of screening carts having workholders for individually supporting the screen section of a color television tube and for transporting the screen from a loading station through a multiplicity of screen processing stations to a discharge station of that conveyor. The small rectangles 31 represent the screening carts of each conveyor and each such cart has its own workholder as will be described more particularly hereinafter. Thirty such carts are represented in each of the four screening conveyors and the conveyors each have an intermittent or step-by-step index type of drive from which it may be said that there are 30 stations on each conveyor devoted to loading, work processing and discharge or unloading. The lettered circles depict specific ones of these stations and similar designations as between the several conveyors designate like stations from the standpoint of manipulation or work process conducted. The following table assigns for each station the process step that takes place, the angle of the axis of rotation of the tube screen in that station relative to vertical and the speed of rotation of the screen about its central axis, that is to say, the axis that corresponds to the longitudinal axis of the tube into which the screen is ultimately assembled. The details by which varying speeds and varying angles of tilt are imposed on the work table will be made clear subsequently.

TABLE I

| Station | Function | Workholder | |
|---|---|---|---|
| | | R.p.m. | Tilt |
| A | Load | 0 | 25° |
| B | Sense | 0 | 120° |
| C | Wash | 10 | 180° |
| D | Rinse | 10 | 180° |
| E | PVA Spray | 10 | 180° |
| F | Dry | 100 | 120° |
| G | Forced Air Cooling | 100 | 120° |
| H | Cooling | 100 | 25° |
| I | Inspection | 0 | 25° |
| J | Slurry Dispense | 6 | 25° |
| K | Slurry Reclaim | 120 | 25° |
| L | Trim and Dry | 20 | 120° |
| M | Unload | 0 | 25° |
| N | Develop | 100 | 120° |
| O | Dump | 6 | 120° |
| P | Drain | 100 | 120° |
| S | Filming | 6 | 25° |

The cross-hatching of the screening conveyors 30 in FIGURE 1 represents the housing and because of the housing the sides of each conveyor loop are enclosed. It is desirable, of course, that the enclosing walls be transparent at least in part to permit observation of the work functions being carried out. The end portions of each conveyor loop, however, are exposed because the operations performed there are manual, namely, those of loading, unloading and inspection.

In addition to the group of screening conveyors 30, there is a second group of endless conveyors 32a, 32b and 32c. They are structurally identical to one another and for convenience of differentiation from the screening conveyors they will be referred to as merry-go-rounds, each having a loading station Q and a discharge or unloading station R. The merry-go-rounds are in alignment and positioned with their terminal stations Q, R disposed between and adjacent the end portions of the screening conveyors to the end that discharge station M of screening conveyor 30a, for example, is in close physical proximity to loading station Q of merry-go-round 32a. Discharge station R of this merry-go-round is similarly located in closed proximity to loading station A of screening conveyor 30b.

Each merry-go-round has a series of light-exposure housings 33 popularly referred to as exposure carts, the details of which will be described subsequently. Suffice it to say at this juncture that each exposure cart supports and selectively exposes predetermined portions of a photosensitive coating which has previously been deposited on the tube screen section accommodated by a particular cart. The exposure is accomplished as the merry-go-round transports that cart with the screen section from the loading station of the merry-go-round to its discharge station. Of course, the photosensitive resist materials which are normally deposited along with the phosphor coating on the screening conveyor have a predetermined exposure time; therefore the number of lighthouses selected for the merry-go-round is preferably adjusted so that the travel from load to discharge takes at least this same amount of time. It is also desirable to relate the movement of the merry-go-round to the movement of the screening conveyors. Since a series of discrete processing steps of very different types are carried out in the many stages of each screening conveyor, it is most convenient that the screening conveyors have an intermittent or step-by-step drive so that the screening carts of each conveyor are stepped from station to station. It is preferred that the merry-go-rounds have an effective index time that is related to the index time of the screening conveyors with which it is associated. The effective index time of any of the merry-go-rounds is the time required for an exposure cart to travel from a given point in its discharge station R to the corresponding point in its loading station Q. In other words, the exposure cart advances from discharge to its loading station in a time equal to or less than the index time of the screening conveyors. When the index time of the merry-go-round is less than that of the screening conveyor, it should be divisible equally into the screening conveyor index time. For example, the merry-go-round indexing may be twice as fast as that of the screening conveyor. As used here, the expression "index time" denotes the time required for a cart to advance from a given position in one work station to the corresponding position of the next succeeding station.

In considering the overall operation of the described arrangement, it will be understood that it is essential to maintain as clean an atmosphere and environment as practicably possible. Accordingly, the conveyors are housed in a room that is kept clean and has carefully protected entrances to preserve its cleanliness. The preferred apparatus and arrangement for maintaining an essentially clean environment for the work stations of the screenings conveyors is the subject of an application filed concurrently herewith in the name of Fiore et al., Serial No. 391,985, assigned to the same assignee as the present invention. It is sufficient to say that the portions of the screening conveyors 30 that are enclosed are constantly bathed in a controlled stream or flow of precisely conditioned air.

Each screening conveyor is driven in the direction indicated by the arrows by a conventional index type of intermittent or step-by-step drive. It has been found that an index interval of approximately 28 seconds is adequate for the processes of the first two screening conveyors 30a and 30b and an index interval of 30 seconds is suitable for the remaining conveyors 30c and 30d. In optimum operation, the shrinkage rate is the same for all conveyors and they may then have identical index times.

It is also preferred that interlocks be provided at any station where, in conducting the work assigned to that station, mechanism of any kind is advanced into the path of travel of the screening carts or the screen sections mounted thereon. The interlock may take the simple form of a microswitch which in its open condition causes the index drive of the conveyor to be interrupted but the microswitch is closed by the return of the movable components of the working station to their normal or rest positions clear of the path of travel of the screening carts and the screen sections under process. Illustrative use of the interlock switches will be alluded to in describing apparatus at particular ones of the work stations but it is not believed necessary to show the electrical system of the index drive incorporating the protection of the interlocks. Their association would be essentially that of a series of circuit, requiring all interlocks to be closed before the indexing circuit is permitted to perform.

Merry-go-rounds 32 rotate continuously in the direction indicated by the arrows and at a speed to correlate lighthouse loading to screen conveyor unloading as described above.

In operation, the screen sections to be processed are delivered to loading station A of screen conveyor 30a by a conveyor feeding in the direction of arrow 34a. As color tubes are currently made, the screen section is the cap of the envelope with a surface to bear the phosphors and a peripheral flange through which the screen section may be integrated with a funnel and neck section by a sealing process. It has been determined that optimum results are attained through the practice of pairing by which is meant that each screen employs its own shadow mask as an exposure device in the screening process and, therefore, each cap delivered to the screening room has its mask along with it.

The operator loads a screen section onto a screening cart at station A of conveyor 30a and also loads its mask on the same screening cart. The conveyor then indexes to position B where the cart is sensed to determine whether or not it bears a screen; if it does, that cart will proceed through the work stations and the screen which it carries will receive the various processing steps. On the other hand, if the screening cart does not carry a screen section, a control to be described later is accomplished which disables the function of the various work stations as this particular cart passes through.

Assuming that the screening cart to be followed through the conveyor by way of illustration does have a screen section, after leaving sensing station B, it advances to station C where it is detergent washed by a high velocity spray and is then rinsed at station D with warm deionized water. The screen is subjected to a spray of polyvinyl alcohol at station E as thus receives a size coating which may be omitted. In the next stations F, the panel is dried by infra red heaters which may be positioned on the wall sections enclosing the conveyor. At station G, cooling is initiated and a fan may be employed to direct conditioned air, which is bathing these stations, more particularly into the screen section. Further cooling is accomplished at station H and the screen is manually inspected at stations I. If any defect is observed, the screen is unloaded and its cart is manually adjusted to disable the automatic processing apparatus at subsequent stations but only while this cart is present in any such station. On the other hand, if the screen passes inspection, it continues through the work stations on the other side of the conveyor. Station H is for further cooling and at station B a further sensing operation takes place. Sensing at this station is a mere precaution and may be omitted, relying on the inspector to adjust any screening cart which has carried a screen section that failed to pass inspection.

At station J, a charge of slurry is deposited on the screen. This slurry contains green phosphor material as well as a photosensitive resist and the rotation of the workholder on the screening cart distributes the slurry evenly across the entire screen section. At the next station K, a probe in the form of a cylindrical tube is lowered into the rotating screen to collect or reclaim excess slurry, the slurry being displaced into the tube through centrifugal force and gravity and returned to a reservoir in a closed circulating system.

After preliminary drying at station F with infrared heaters, the cap advances to station L where a trim probe is introduced over the skirt of the panel. The trim probe is a water jet which cuts the slurry deposit just above the meeting line of the screen and its peripheral flange. Following the trim step, the panel is further dried at stations F and cooled in the final stations H from which it advances to discharge station M.

The screen section with its mask has now completed a traverse of the first screening conveyor and is ready for exposure. The mask is first positioned within the screen section and the assembly is removed from conveyor 30a and placed on the exposure cart instantaneously at loading station Q of merry-go-round 32a.

The exposure carts of merry-go-round 32a differ from those of units 32b and 32c only in the specific location of their light sources. Since the cap to be exposed on merry-go-round 32a bears a coating containing green phosphor, the light source in each exposure cart of that merry-go-round is positioned to simulate the location of the green gun in the finished tube, assuming that the process is directed to the production of a three gun shadow mask tube. The screen section under consideration is subject to exposure in its cart in order to locate the dots of green phosphor on the screen. Each exposure cart has its own timing device which may be a chronometer or may be a light integrator. The first maintains an exposure for a fixed period of time and the latter maintains an exposure sufficient to achieve a desired total integration of incident light. Generally, operating times can be established that permit use of a timing mechanism on the exposure cart. The clock mechanism removes a shutter from the lightpath of a high pressure mercury lamp as the cart leaves loading station Q and returns the shutter to block that lightpath after the selected exposure interval which will be no more, and generally less, than the time required for this lighthouse to arrive at discharge station R. The exposed screen section with its mask, through which it has been exposed, is now removed from the exposure cart and loaded onto the screening cart at station A of screening conveyor 30b. Of course, the mask is removed from the panel and stored on the screening cart, leaving the panel free for further processing.

Generally, the same steps are carried out on screening conveyor 30b except that the pass from the loading station A to inspection station I is devoted to developing of the green dots. In developing stations N, a spray of warm deionized water, carefully controlled as to pressure, temperature and pattern, removes all except the exposed portions of the phosphor coating that had been applied to the screen on the preceding conveyor 30a. This results from the fact that the exposure of the photoresist in the exposure cart causes the desired dots to be insoluble in water where as the unexposed portions of the coating remain soluble and, therefore, they wash off at stations N. Concurrently, a water stream directed at the flange of the screen section removes any unwanted residue of green phosphor coating.

The inspector at stations I determines whether or not a satisfactory pattern of green dots has been laid down on the screen. If not, that screen is rejected, otherwise, it proceeds down the other side of conveyor 30b and undergoes essentially the same processing steps as took place in its travel through the corresponding portion of the preceding conveyor. This time, however, the coating includes a blue, rather than a green, phosphor.

After its arrival at discharge station M of conveyor 30b, the screen once again receives its mask and the assembly is then placed on the exposure cart at loading station Q of merry-go-round 32b. This cart exposes the portions of coating that are to be developed to produce the blue phsophor dots, from a light source positioned to simulate the location of the blue gun, the exposure again taking place as the cart travels from its loading station Q to its discharge station R.

After leaving merry-go-round 32b, the screen is relieved of its mask and again placed into position on a screening cart of conveyor 32c along with its mask. There then follows development of the blue dots, inspection and if the screening has progressed satisfactorily, a further deposit of a photosensitive resist bearing red phosphor material. Upon leaving screening conveyor 30c, the screen with its mask properly inserted, is loaded on merry-go-round 32c for its third and final exposure. Upon completing its traverse of this exposure conveyor, the screen is placed on a screening cart of the final conveyor 30d, its mask having first been removed from within the screen proper and secured in position on the screening cart. The red dots are now developed and there is a final inspection at station I of this last screening conveyor.

Assuming that the three series of dots have been properly deposited, the mask continues down the final side of conveyor 30d where at station S the deposit is of an organic film solution, the excess of which is dumped and drained off at stations O and P. At the remaining stations, the steps of trimming and drying take place with a further inspection at station I immediately prior to discharge station M. The completed screen, completed in that it has received a deposit of red, blue and green phosphor dots and an organic film preparatory to aluminizing, is led off in the direction of arrow 34b. It is convenient to have a conveyor carry the completed screen with its mask to other sections of the tube plant where aluminizing takes place. Additionally, a salvage conveyor may extend across the inspection ends of the screening machines, as indicated by arrow T, and reject screen sections may be deposited thereon for removal from the screen room.

The described arrangement is highly efficient; the screening operation may be accomplished with five loading operators and four inspectors at a production rate of a completed screen section every 30 seconds or less.

*Screening conveyor*

Structural details of the screening conveyors are disclosed in FIGURES 3–9, inclusive.

Figure 4:
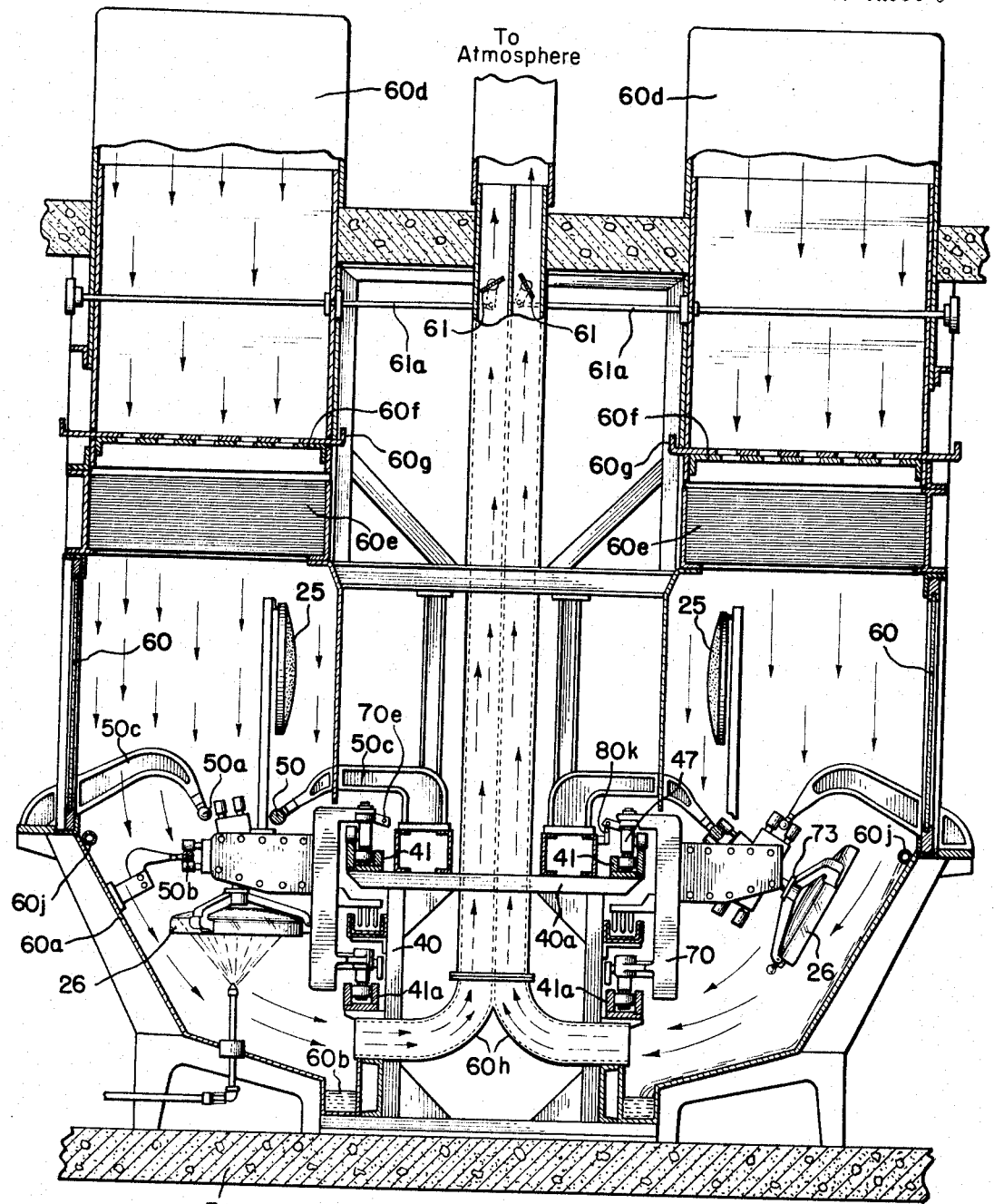
FIGURE 4 is a cross-sectional view of a single screening conveyor taken along section line 4—4 of FIGURE 2.

The conveyor is structurally supported on a frame 40 of structural steel anchored to the floor 39 of the screening room. As shown in FIGURE 4, the frame, in cross-section, is an open rectangle and supports a pair of runways 41 on opposite edges of the top-most frame member 40a. Each runway is comprised of a pair of vertical rails with a separation dimensioned to accommodate a conveyor chain. Similar rails 41a are supported essentially midway of the base frame also to accommodate a link chain. The outer rails completely inscribe the screening machine and define the closed elongated loop of the conveyor although the innermost rails of each pair has spaced discontinuities to accommodate sprocket drives for advancing the conveyor.

Referring to FIGURE 9, it is seen that the conveyor has a pair of link chains 42 and 42a disposed between rails 41 and 41a respectively. In each case, these chains are continuous with closed loops and a pair is provided to make certain that the screening carts transported by the conveyor never get cocked or out of alignment. At each joint or coupling, the conveyor is provided with a horizontally disposed roller 42b and these rollers ride in the tracks 41, 41a. The chains are concurrently driven by sprocket wheels 43, 43a (FIGURE 3) which are driven from a motor 44 through an indexed intermittent drive 45 designed to rotate each gear 90° in each step of the index program. No novelty is predicated on the mechanics of the indexed drive which may have any well-known construction.

Both the upper and lower conveyor chains have provisions through which the many screening carts are mounted thereto. For the upper chain 42 there are a pair of mounting blocks 46 for each such cart. Each block is mechanically coupled to chain 42 at a link joint and each block supports a freely rotatable, vertically disposed roller 47 which engages the upper surface of the outermost element of track 41, utilizing this surface as a bearing or support for most of the weight of the load represented by the screening cart (FIGURES 4 and 9). A mounting pin 48 extends from each block 46 to enter cylindrical mounting bosses of the principal support plate for the screening carts. The hole of at least one such boss is sufficiently larger than the diameter of mounting pins 48, preferably being a slot, to permit relative movement of the conveyor chain and its load to avoid binding. A generally similar arrangement of mounting blocks 46a and mounting pins 48a are provided for the lower conveyor chain to provide further points of coupling with the screening carts. In this case, however, the mounting blocks do not have vertical rollers corresponding to rollers 47 of the upper chain although they may be provided if desired.

Table I records the fact that the workholder of the screening cart assumes different angles of tilt at various operating stations, these angles being chosen to optimize conditions for the performance of a particular work function. The angular relation of the workholder is detremined by cam followers cooperating with guide or tilt rails that may be considered part of the conveyor structure.

More specifically, three tilt rails 50, 50a and 50b are employed (FIGURE 4). They are segmented and usually of different rod stock. At any work station, it is preferred that the heavier rail be firmly engaged by cam followers of the workholder to secure the workholder in a particular angular relation as determined by guide rails of lesser cross-section which are contoured as required to change the angular aspect of the workholder as it progresses from one station to the next. The contouring insures harmonic angular acceleration and deceleration during the tilt movements of the workholders. In FIGURE 5, by way of illustration, the rail 50 of heavy stock is effective in maintaining the angular relation of the workholder and a lighter weight rail 50b is available at the output of this work station to engage the cam follower of the particular workholder to effect angular displacement thereof as it travels from this station to the next. Contouring of such a rail for this purpose is represented in FIGURE 8.

It is preferred that the small diameter rails so adjust the angle of the workholder that, as it approaches a particular station, a heavier rail at that station is appropriately aligned to receive the cam followers of the workholder and maintain the angle that has been established by the contoured small diameter rails. As previously indicated, these rails are segmented and are supported by bracket arrangement 50c secured to the frame of the conveyor (FIGURE 4).

Table I further records that the rotational speed of the workholder of any screening cart may be different in one work station than in another. For the most part, this result is achieved by the use of segmented power distribution rails which may also, for convenience, be deemed part of the conveyor structure. The base frame 40 of the conveyor supports a U-shaped trough 51 (FIGURE 5) which, like the tracks for the conveyor chains, encircles the entire screening machine. Since it is to distribute electrical power, the trough is insulated from the machine base either by constructing it from insulating material or by using a conductive structural trough which is spaced from the frame by insulation. It is contemplated that the driving power for the workholders will be supplied by variable speed D.C. motors and, therefore, the power distribution system contained within trough 51 has three busses 52 which extend horizontally and are insulated from one another. This is easily accomplished by positioning each bus within an insulating compartment or by separating the busses by intervening walls of insulating material. For any run of the conveyor as to which the workholder is to maintain a fixed speed, the corresponding section of the power distribution system is connected with a generator (not shown) delivering an appropriate terminal voltage. Any other runs of the machine, requiring different rotational speeds of the workholders, are accommodated by having other D.C. sources of appropriate potential connect to their corresponding segments of the power distribution busses in any well-known manner.

*Air conditioning*

It is of material importance that the screening machine have a conditioned air system precisely controlled as to rate of flow, temperature and humidity. The type process carried out in the coating room is sensitive to variations of temperature and humidity. Moreover, the controlled air flow may serve as a wash to protect the work from the contaminating effect of foreign particles whether they are in the ambient atmosphere or result from the work processing. This feature of the screening apparatus is the subject of concurrently filed application, Serial No. 391,985, in the name of Fiore et al.

The details of the air wash are revealed in FIGURES 1-4, inclusive. Instead of placing total reliance on establishing a chemically clean room for accommodating all of the screening apparatus, the illustrated arrangement employs a screening room that is generally clean and also an air wash or curtain confined to each screening conveyor. For that reason, a housing is constructed to enclose at least some and preferably most of the work stations of each conveyor. This housing has vertically extending walls in space opposed relation on opposite sides of the path of travel of the workholders. Specifically, on each side of the conveyor loop there is a front vertical wall 60 which is formed of glass paneling at least at the level of the work stations to permit observation of the screening process. The front wall of the housing, from a level corresponding approximately to the working level of the stations, is canted inwardly to serve as a baffle 60a that leads to a drain trough 60b formed at very close to floor level.

There is a back wall 60c of the housing in spaced opposed relation to front wall 60 but on the opposite side of the path of travel of the workholders on the screening carts. As shown, the rear wall terminates just above the surface of the screening carts and the succession of carts, in effect, serves as a continuation of the housing vertically downwardly as required to establish a controlled path for an air wash. The housing formed by walls 60, 60c leads to an air conditioning system or other source of conditioned air coupled to the housing at a point above the work processing areas of the stations enclosed by the housing. The source of conditioned air is designated 60d and it may be of any conventional design and construction; no novelty is predicated on the design of this source as such. Preferably, a system is selected which permits precise control of conditioned air delivered vertically downwardly through the housing, controlled as to rate of flow, as well as temperature and humidity.

Of course, the conditioned air is as clean as practicable and, if desired, further filtering 60e may be provided in the housing above the level of the work processing stations. A convenient adjustment of the quantity of air delivered to the stations is made possible by a damper 60f. As shown, this is formed of two plates that may have one or more apertures or windows slidable relative to one another to control the effective opening that they collectively afford in the conditioned air housing. A hand grip 60g may be formed on the movable one of these plates to facilitate adjustment.

There is an exhaust duct in communication with housing 60, 60c at a point below the work processing areas of the enclosed stations for establishing laminar flow of conditioned air downwardly across the workholders instantaneously in the enclosed stations. This duct is designated 60h and it is a simple sheet metal structure opening into housing 60, 60c just above the location of drain 60b. Dampers 61, adjustable by means of control levers 61a, are provided in the exhaust ducts. The enclosing walls and exhaust system preferably extend longitudinally of the conveyor throughout most of its length, leaving exposed only the work stations which are at the end portions or bights of the conveyor loops. The exposed portions of the conveyor accommodate the loading and discharge stations A and M at one end and inspection stations I at the other.

It has been previously pointed out that on the first screening conveyor 30a there is a succession of drying stations F followed by a forced air cooling station G. Forced air cooling may be achieved by installing a fan or blower in the front wall 60 of the housing at the work station in question and at a level corresponding to a position of the screen section of the tube being cooled. The blower will deflect the conditioned air that is discharged vertically through the housing, directing it into the screen to accelerate cooling. In order to avoid unnecessarily encumbering the drawings, this blower has not been illustrated.

A water line 60j (FIGURE 4) is positioned adjacent baffle 60a, near the top portion of the baffle and extends parallel to the sides of the conveyor. It has openings or discharge outlets along its length to discharge water directed down the baffle into drain 60b. As a convenience of construction, the water line may extend throughout the length of housing 60, 60c although it is not required at all work stations. The water wash is most helpful in stations such as slurry dispensing, reclaiming and trimming in order to avoid unwanted accumulation of slurry material within the housing of the conveyor. It is also useful at the drying stations to prevent the enclosing structure from becoming too hot.

In one constructed embodiment of the screening apparatus, source 60d supplied conditioned air at a temperature of 75° F.±1° at a relative humidity of 50%±2% and at a rate of flow of 75 feet per minute. This, in the absence of any obstacles in the air stream, provides laminar flow of conditioned air downwardly through the work stations as indicated by the arrows in FIGURE 4 within housing 60, 60c and out exhaust ducts 60h. It has been found practical to recirculate 75% of the air stream of the first three screening conveyors, the remaining 25% being diverted to the fourth machine 30d where an additional 25% is added from supply 60d. After leaving this machine, the air is discharged into the atmosphere. Of course, both the screening carts and the automated processing apparatus are present in certain of the stations and preclude perfect laminar flow but the rate employed is a sufficient approximation for the intended result. The turbulence is insufficient to seriously interfere with laminar flow. One advantage of this flow is that the work is continuously washed with air in a manner which, if contaminants are dislodged, they are directed down to the exhaust of the machine. It will be observed, particularly in FIGURE 4, that the mask 25 as hung on the cart is stored vertically within the flow of conditioned air to be washed along with the screen section 26 that is being worked upon in the station.

Figure 2:
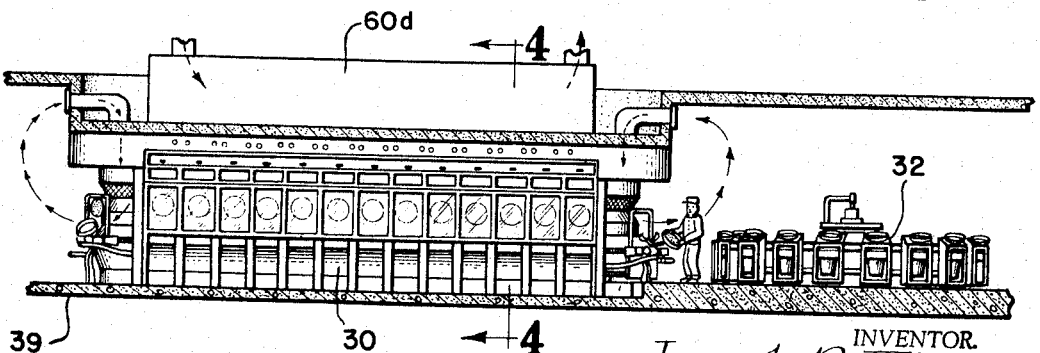
FIGURE 2 is a side elevational view of the apparatus taken as indicated at 2—2 in FIGURE 1.
Figure 3:
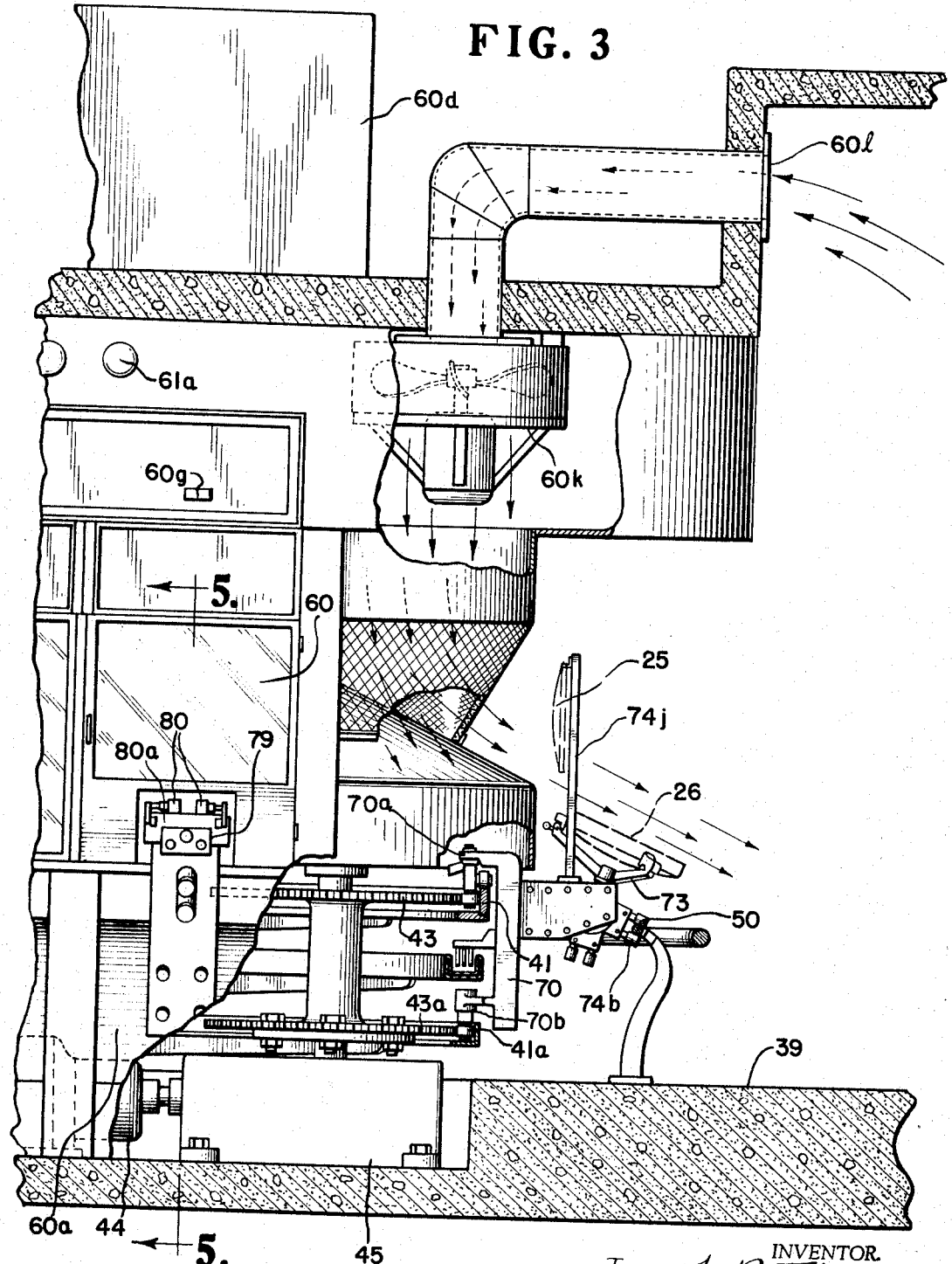
FIGURE 3 shows an end portion of one of the screening conveyors within the section 3—3 of FIGURE 1, the view being partially broken away to reveal details.

The manipulations at the exposed stations at the ends of the conveyor are carried on by operators and it is desirable that they, too, stand in an air wash to preclude clothing dirt from contaminating the screening process. This result is obtained by providing means for establishing a flow of air directed vertically downwardly and radially outwardly of the exposed end portions of the conveyor and the work stations located at such end portions (FIGURES 2 and 3). For this purpose, room air is recirculated by means of a blower 60k which directs the air through a filter downwardly and across the work stations and the operator attending them, the flow being indicated by the arrows. Recirculation is through a return duct 60-1 at the ceiling of the screening room.

Screening cart

The structural details of the screening cart are shown in FIGURES 5–9. It has two separable principal parts, one of which is a carriage frame 71 to which the workholder and most of the accessories of the cart are affixed. The other is the means, or carriage frame support plate 70, for mechanically coupling the carriage frame to the conveyor. The support plate 70 appears in detail in FIGURES 8 and 9. It has cylindrical bosses 70a in a top flange 70b and in a shelf 70c projecting in the direction of the conveyor near the lowermost edge of plate 70. It further has elongated bosses 70d in flange 70b and in shelf 70c and the four bosses accept mounting pins 48, 48a to mechanically couple the support plate of the screening cart to the conveyor. After the plate is in position, it may be convenient to provide a washer or other locking element to prevent any of the pins from inadvertently withdrawing from the mounting boss of the support plate. A control member or flag 70e is also mounted to flange 70b of the support plate through an over-center arrangement of springs 70f (FIGURE 6) which causes the flag to be a two position device. The flag has a pivot pin 70g rotatably secured between fingers 70h carried by flange 70b and, forwardly of pin 70g, the flag carries an anchor pin 70j for springs 70f. This is a well-recognized over-center construction and permits the flag to have two discrete positions, one above and the other below the plane of pivot pin 70g. The flag is an important part of a control system to be described hereinafter under the caption "sensing."

The other principal part of the screening cart, namely carriage frame 71, couples to support plate 70 by means of a pair of pins 71a provided near the edges of an upper flange of frame 71 (FIGURES 5 and 8). These pins are received in mounting holes of support plate 70. If desired, one or more hold-down bolts 72 may thread into support plate 70 to lock frame 71 in position after the pins have been properly seated.

In order for the screening cart to convey to cap or screen section 26 for the color tube through the screening conveyor, it has a removable workholder 73 having a central hub 73a and three arms 73b only two of which appear in FIGURE 5. The inner surfaces of these arms have a protective resilient covering or pads to protect against scratching of the tube cap 26 and one arm has a clamp 73c constructed within it. As is evident in FIGURE 5, the clamp has a handle which may pivot downwardly to remove a jaw 73d from its clamped to its released position, whereas displacement of the handle to the position shown in FIGURE 5 restores the clamp to its closed position. Workholder 73 through its clamp supports the cap 26 of a color tube for rotation about a first axis, namely the central longitudinal axis of the workholder. To this end, the workholder has a depending shaft 73e which terminates in a driven gear 73f.

The workholder, in turn, is secured to frame 70 by a support means that is rotatable about a second axis normal to the axis of rotation of the workholder. As shown, this support is a cylinder 73g which is rotatably supported by bearings accommodated within a pair of housings 73h and 73j located on opposite edges of the front panel or face of carriage frame 71 (FIGURE 8). Cylinder 73g is also provided with suitable bearings which rotatably support drive shaft 73e of the workholder (FIGURE 5).

Within housing 73h there is disposed a variable speed driving motor and reduction gear system 74. For the case at hand, a D.C. motor is employed and a conventional slip clutch couples the output of the speed reducer to a drive shaft 74a positioned coaxially with cylinder 73g and terminating in a drive gear 74b (FIGURE 7). The driver gear is in continual meshing engagement with driven gear 73f of the workholder and affords a continuous mechanical driving connection from motor 74 to the workholder to rotate the workholder irrespective of the position of the screening cart along the path of the conveyor, dependent only on whether or not the driving motor is energized.

Housing 73j encloses a speed control potentiometer 74c in order that vernier adjustments may be made of the motor speed. It is convenient to enclose within housing 73j a cable connector through which the energizing circuit for motor 74 may be extended to the power distribution busses 52. A cable 74d between the two housings 73h and 73j puts the motor and its control 74 in circuit with the power connector (not shown). The power connector assembly connects to a power plug which forms the termination of a brush assembly 74e carried by support plate 70 (FIGURE 9). There are three brushes 74f in this assembly, one for each of the power distribution rails and their connectors lead to the plug of this assembly. Housing 73h and 73j are completely enclosed and a side panel of each is removable to give access to motor 74 and the power circuit. These housings seal the motor and reduction gear assembly which is desirable as a protection against their contributing dirt or contaminants to the screening machine. They also seal the power connections which is desirable as a protection against hazards should there be explosive conditions present in any work station.

It will be noted in passing that the power busses 52 are accommodated by a trough 51 which permits the rails to be immersed in an insulating liquid such as deionized water if that is desirable. Certainly, if copper busses are employed for power distribution, it may be highly desirable to immerse the rails because of the extreme sensitivity of the screens to copper flakes and dust. With stainless steel rails, however, it is not found necessary to have them immersed in fluid.

The angular relation of workholder 73 relative to a vertical axis is under the control of tilt rails 50 and cam followers extending from support cylinder 73g into engagement with these rails to displace the workholder in accordance with the contour of the cam track which they provide. Three sets of cam followers are shown (FIGURE 5) each of which includes a pair of rods 74g which terminate in rollers 74h freely rotatable on the rods. The cam followers are dimensioned so that the engagement with the large guide rail 50 (FIGURE 5) holds the workholder firmly at one angle. At the same time, the other guide rails 50b being of relatively smaller diameter give sufficient freedom of motion between the cams and the rails to accomplish large angular displacements of support cylinder 73g about its axis of rotation in the course of a relatively small lineal travel of the cart, the axial displacement being determined by contouring of the small diameter guide rails 50b. Representative angles to which the workholder is displaced in this traverse around the conveyor loop are indicated in FIGURE 5. The full line showing is a displacement of 25° relative to the vertical, the phantom illustration next following in a counterclockwise direction is a 120° and the remaining phantom illustration is a displacement of 180°.

It is preferred that workholder 73b be removably affixed to cylinder 73g and this may be accomplished by terminating shaft 73e in a mounting plate to which the spider of the workholder may be secured by machine bolts. The representation of FIGURE 8 is of the cart with the workholder removed.

Since pairing is practiced in this screening process, it is essential that mask 25 be maintained in direct association with its screen section 26 throughout the screening process. Accordingly, a U-shaped frame 74j is secured to carriage frame 71 and the screen 25 may be fully suspended from a clamp or hook 74k at the top of the frame.

In using the screening cart, at station A of any conveyor workholder 73 is manually rotated, if necessary, to bring clamp 73c in the position shown in FIGURE 7. This clamp is then released and the top cap 26 placed within the workholder and secured by closing the clamp. At the same time, the mask 25 associated with the cap is suspended from frame 74j. As the screening cart travels with the conveyor, workholder 73 is rotated about its longitudinal axis under the control of motor 74 as it is energized by the power distribution rails 52 disposed along the whole run of the conveyor. There are certain stations, such as loading station A, where the motor is not energized and the workholder is not rotated. The various speeds and conditions of rotation are set forth in Table I.

Also, as the screening cart traverses the machine, engagement of tilt rails 50 by cam followers 74h controls the angular relation of the workholder for optimum positioning for the work to be accomplished at each of the several work stations.

Features of the screening cart are claimed in a concurrently filed application of Fiore et al., Serial No. 391,985.

*Sensing*

Obviously, if a screening cart should go through the various work stations of any screening conveyor without carrying a cap or screen section 26 to be worked upon, there would be both a waste and a highly undesirable dispersion of slurry and fluids on the conveyor. In order to avoid any such undesirable result, each screening conveyor has a control system which determines whether or not the work process is to be carried out at the various stations.

Figure 10:
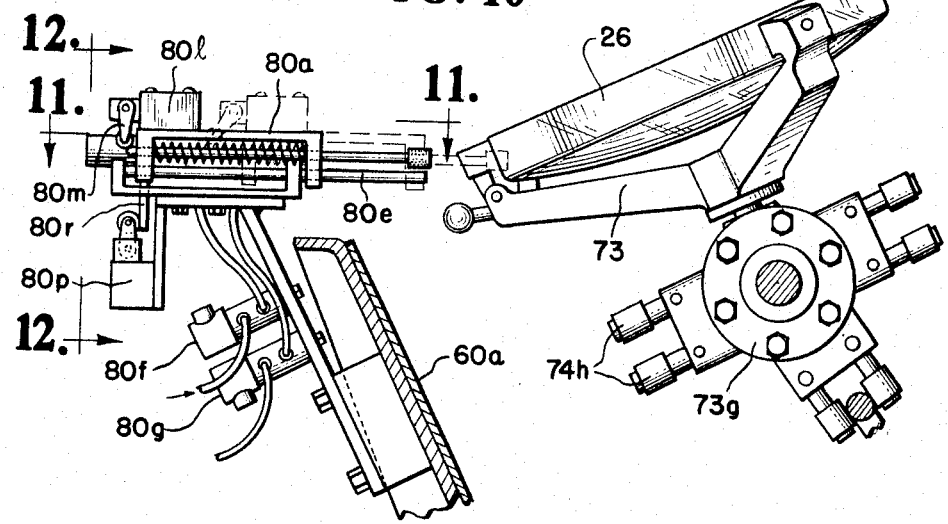
FIGURES 10-12 are views of a probe arrangement for sensing the presence or absence of a screen section in a workholder of a screening cart transversing the work stations of the screen conveyor.
Figure 11:
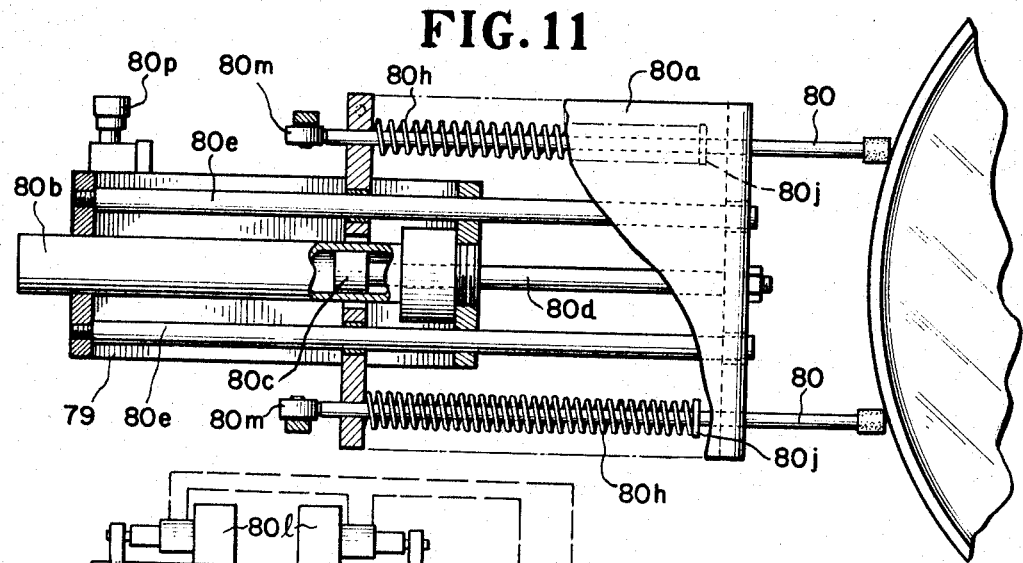
Figure 12:
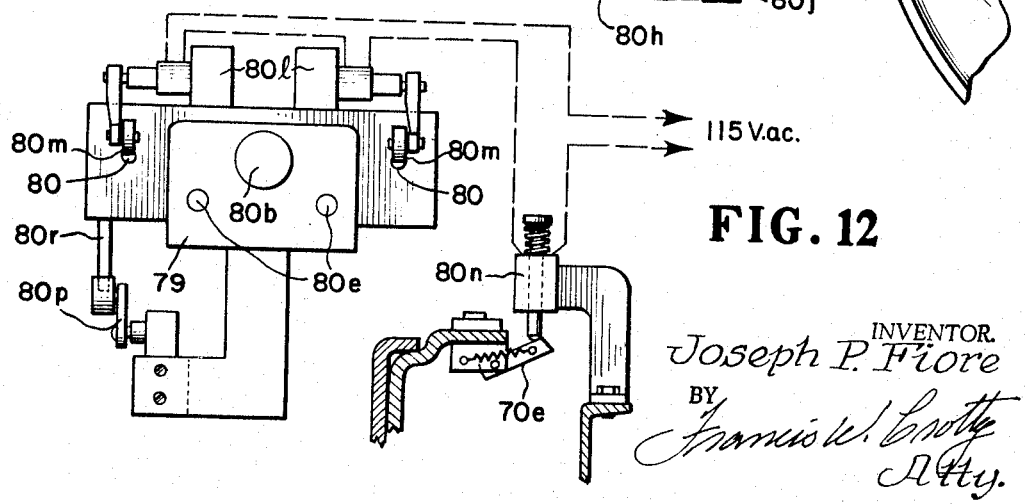

The control system comprises a probe for sensing the presence of a tube cap within the workholder. Referring to FIGURES 10–12 which represent the control system, a plurality, specifically two, probes 80, 80 are provided being slidably mounted within a frame 80a of U-shaped configuration with its arms apertured to accommodate probes 80. As indicated in FIGURE 10, the probes are supported adjacent the screening conveyor and in particular adjacent the lowermost portion of workholder 73 here shown in the angular relation that it assumes in probe sensing station B of each screening conveyor. The slidable mount for the probes permits the probes to be movable from a rest position shown in full construction lines in FIGURE 10 to a fully actuated position designated by the broken-construction line in the same figure which the probe may assume only if the workholder being sensed does not contain a cathode-ray tube component, specifically, a cap or screen section 26.

In order to accomplish its sensing function, each probe may be displaced by an actuator which yieldably advances the probes from their rest toward their fully actuated positions. The actuator illustrated includes an air cylinder 80b having a piston 80c with a rod 80d mechanically connected to a flange of member 80a. A pair of guide rods 80e, positioned on opposite sides of and in parallel relation to the air cylinder and its piston extend through apertures of member 80a and provide rails upon which that member may readily slide under the influence of piston 80c as it is displaced within its cylinder. These rods are supported on a stationary frame 79. Piston displacement is accomplished in the usual way of an hydraulic motor by means of an air valve 80f which may be operated to displace the piston to the right as viewed in FIGURE 10 and by a second air valve 80g operated to restore the piston to a rest position, retracting the probes from the path of the workholders. While there is a positive connection between member 80a and piston rod 80d, the coupling to the probes is a yieldable one afforded by coil springs 80h which are concentrically arranged relative to the probes. At one end each of the springs abuts a flange of member 80a and at their opposite ends they engage a washer or other stop element 80j mechanically connected to each probe.

There is need of means for energizing the hydraulic actuator in timed relation to the movement of the screening conveyor to effect sensing of the workholders, one at a time, by probes 80. The actuator might readily be energized by a trip to be engaged by a workholder as it approaches station B but it is just as convenient to include a control circuit within indexing control system 45 to time the operation of valves 80f and 80g in a desired sequence relative to the entry and departure of a workholder from sensing station B.

The information obtained from sensing of the workholder is utilized to displace a control member provided for each of the workholders and displaceable into a position to control the processing function conducted in at least one of the work stations of the conveyor but preferably controlling the work functions in all of the automated stations of the conveyor. The control member on each screening cart is the element or flag 70e described hereinbefore in relation to FIGURES 6 and 9. With reference to FIGURE 6, the flag travels in the direction indicated by an arrow as the screening cart is advanced with the conveyor. With the flag in its rest position, it passes above the level of a microswitch 79 located at each automated work station to control its process. On the other hand, if the flag has been displaced into its actuated or effective position, it bears against microswitch 79 as the screening cart moves along, closing the switch to initiate the work function at this automated station.

There are means to establish flag 70e in its rest position prior to the entry to station B of the screening cart with which it travels. Again, this function may be accomplished from the programming system of index 45 but it is just as convenient in this case to arrange a cam block 80k (FIGURE 4) on the frame of the screening conveyor in the path of flag 70e mechanically to displace the flag to its rest position after the screening cart leaves the final processing station.

Additionally, the control system has means, responsive to the position attained by probes 80 during sensing, for determining the position of flag 70e. This control means has a pair of switches 80–1 carried by frame 80a and having a switch operator 80m in alignment with each of the probes for actuation thereby. As indicated in FIGURE 12, switches 80m are series connected in a control circuit for energizing a solenoid 80n. Energization of the solenoid displaces its armature which moves flag 70e from its rest position (FIGURE 12) to its actuated position.

It is prudent to provide an interlock at the sensing station so that indexing of the conveyor may only take place if the sensing operation has been completed and the probes restored to their rest position of FIGURE 10. Such an interlock is represented at 80p. It is a microswitch included in the programming drive control of the conveyor and, physically, it is in the path of an abutment 80r on member 80a which closes switch 80p when that member has been returned to its home position.

In operation, the programming system of index 45 operates valve 80f to advance probes 80 toward a workholder after that workholder has been stopped in sensing station B. Since the workholder has a frame or spider-like structure, the pair of probes, displaced relative to one another in the direction of movement of the conveyor, is a precaution against the possibility that a single probe may engage the workholder rather than sensing for a screen cap 26 within the workholder.

As piston 80d advances to the right, displacing member 80a in the same direction, the probes move from their rest toward their fully actuated positions. If the workholder does, in fact, contain a tube cap, both probes engage the cap in normal operation as represented in FIGURE 11. This arrests their further movement prior to the complete travel of piston 80d to the right. As a consequence, in the continued movement of member 80a by the air cylinder the switch operators 80m are engaged by the ends of probes 80. The switch operators may conveniently terminate in rollers which roll up upon the probes, rotating the switch operators and closing the switches. If both are closed, solenoid 80n is actuated and flag 70e of the screening cart is moved to its operative position. Immediately thereafter valve 80g operates to restore the mechanism to the position shown in solid outline in FIGURE 10. In so doing, it causes abutment 80r to close microswitch 80p and permit the indexing of the conveyor to continue.

In case the workholder does not, in fact, contain a tube cap, at least one of probes 80 is permitted to advance to its fully actuated position. In such case, the switch operator 80m associated with that probe is not actuated; the energizing circuit of solenoid 80n is not completed and flag 70e is retained in its rest position. Accordingly, the further progress of the screening cart through the conveyor does not occasion actuation of the automated work processing apparatus in the various stations.

The described control system is the subject of application Serial No. 392,010 filed concurrently herewith now U.S. Patent No. 3,259,224, issued July 5, 1966 in the name of Raymond J. Pekosh and assigned to the same assignee as the present invention.

Each cap 26 must be maintained in close association with its mask throughout the screening process and it may, therefore, be desirable to sense the presence of mask 25 at the same station. A photocell circuit, for example, that is energized concurrently with the sensing mechanism, may detect the presence or absence of the mask and afford an indication to the operator.

*Work stations*

No claim of novelty is made in this application to the structural details or operation of the automated machinery at the various individual work stations. However, in order to complete a disclosure of the screening plant, a discussion and at least functional description will be given for representative ones of these stations.

*Wash, rinse and develop stations*

As a screening cart approaches any such station, its angular position as well as its rotational speed, if any, will have been established by tilt rails 50 and power distribution busses 52 to the values indicated in Table I. As the cart enters the station, its flag 70e closes microswitch 79 of that station to energize its process timer. The timer effects the timed operation of the necessary valves for admitting the washing and rinsing fluids to the screen cap and then closes them within an operating cycle that is equal to or less than the index time of the conveyor. A representation of the washing process is included in FIGURE 4.

*Slurry dispense station*

Figure 13:
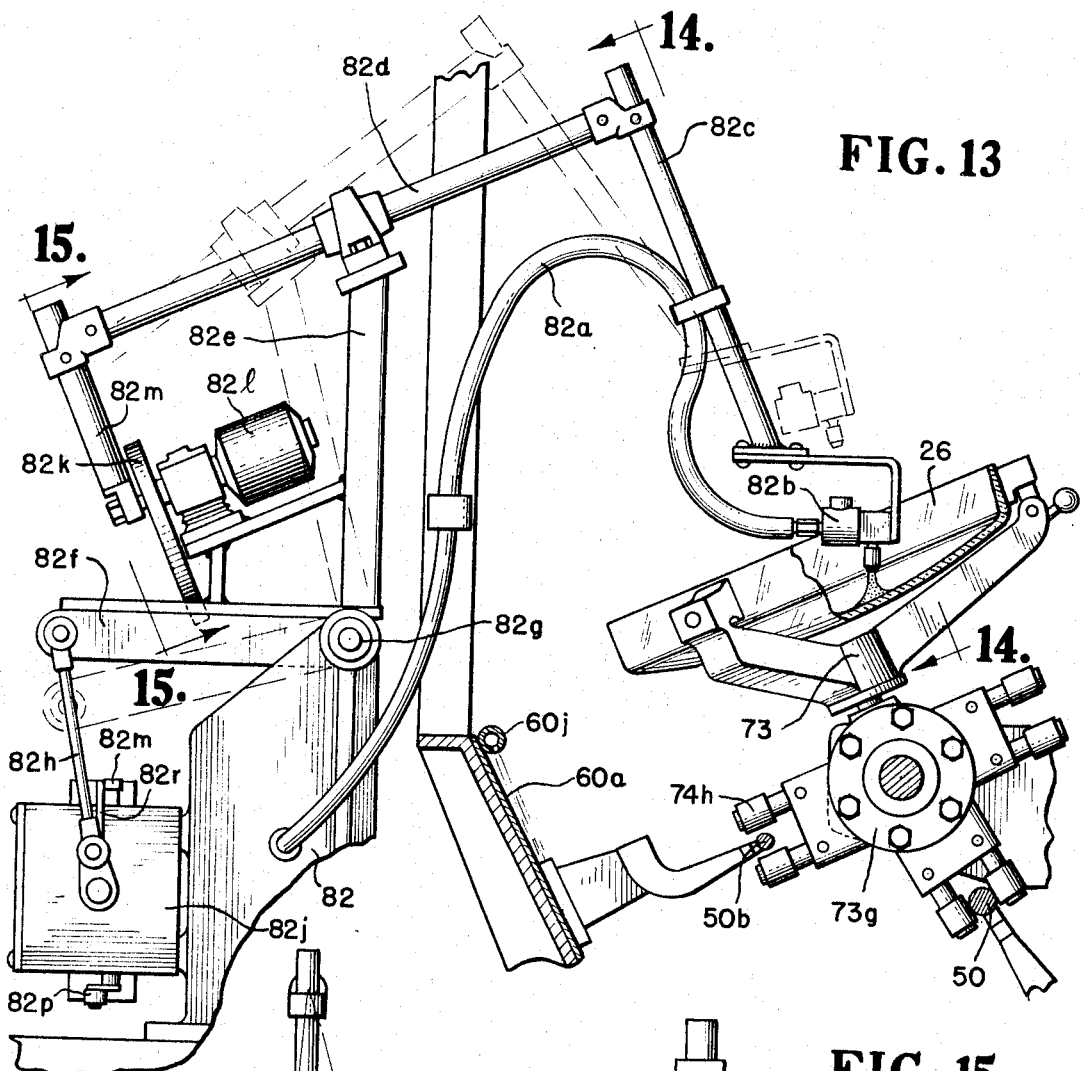
FIGURES 13–15 are details of the slurry dispensing station.
Figure 14:
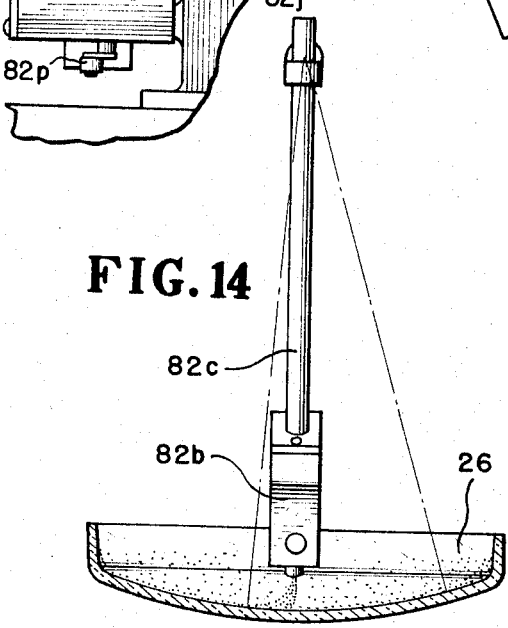
Figure 15:
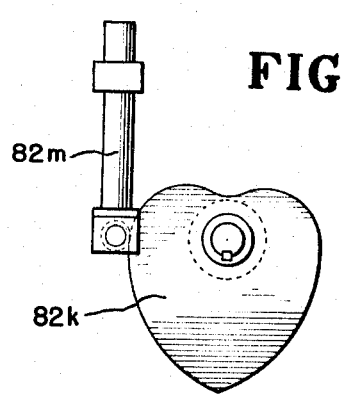

As represented in FIGURES 13-15, this station has a reservoir 82 of the slurry that is to be dispensed into cap 26. The deposit is accomplished through a conduit 82a which terminates in a dispense head 82b. At the time the slurry is dispensed, it is desirable to have head 82b close to the screen surface of the tube cap, below the level of the flange which surrounds the screen surface. Obviously, the head cannot conveniently be maintained at such a level at all times; it would interfere with the movement of the conveyor. Accordingly, there is a mechanism to raise and lower the dispense head.

The head is carried on an arm 82c of a frame which also has arms or links 82d, 82e and 82f. This frame is pivoted at point 82g and the free end of link 82f connects with a crank 82h driven by a motor or actuator 82j. Actuation of this motor displaces the frame from a rest position shown in broken outline to the position indicated in full lines. It is also desirable to displace the head across the screen as the slurry is being deposited. This is accomplished by a heart-shaped cam 82k driven by another motor 82-1. There is a cam following lever 82m engaging the cam and carried by the free end of frame element 82d.

A pair of microswitches 82n and 82p facilitate timed actuation of the manipulations to be carried out at this station. These switches are actuated by a switch operator 82r rotating with crank 82h.

As the workholder arrives in slurry dispense station J, its rotation and tilt angle will have been determined and flag 72e of the cart will have closed the microswitch to commence the dispensing function. Initially, motor 82j is energized and actuates crank 82h to lower dispense head 82b into the screen cap. At maximum displacement of the crank, interlock switch 82n is operated which de-energizes motor 82j. Closing of interlock 82n starts a process timer as well as a delay timer. The process timer energizes cam motor 82-1 to rotate cam 82k and oscillate the dispense head across the screen. If the delay time is zero, the process timer also opens the valves and commences the slurry deposit directly; otherwise, the deposit may be delayed until the dispense head has achieved a particular point in its oscillation. When a measured deposit of slurry has been made, the process timer stops, deenergizing cam motor 82-1 which will have completed one revolution of cam 82k. Actuator 82j is reenergized and crank 82h restores the dispense head to its elevated position out of the path of travel out of the tube cap. When the crank has completed its travel, operator 82r closes microswitch 82p, the interlock that permits indexing of the conveyor to continue. The amount of slurry dispensed is controlled by the dispensing time, the slurry pump pressure, the orifice of head 82b and the slurry viscosity.

*Reclaim station*

Figure 17:
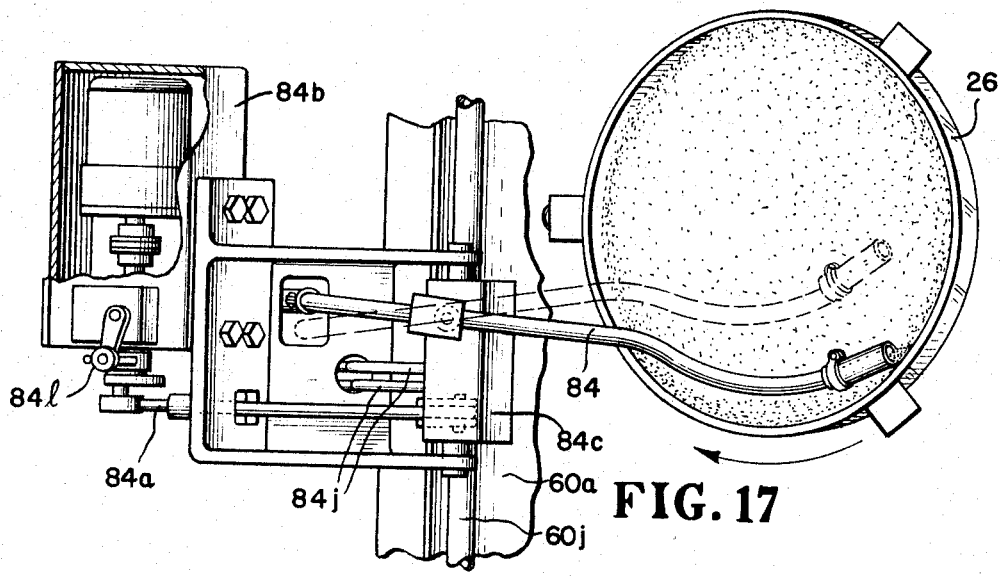
Figure 18:
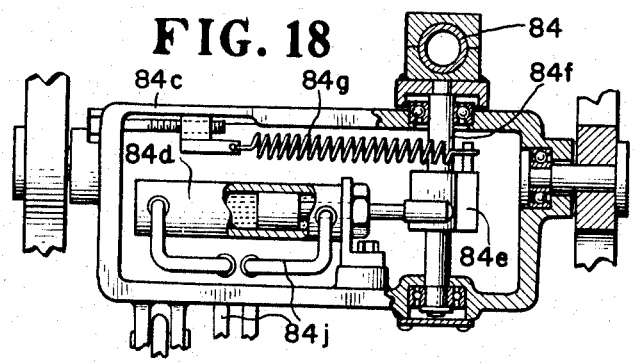
Figure 19:
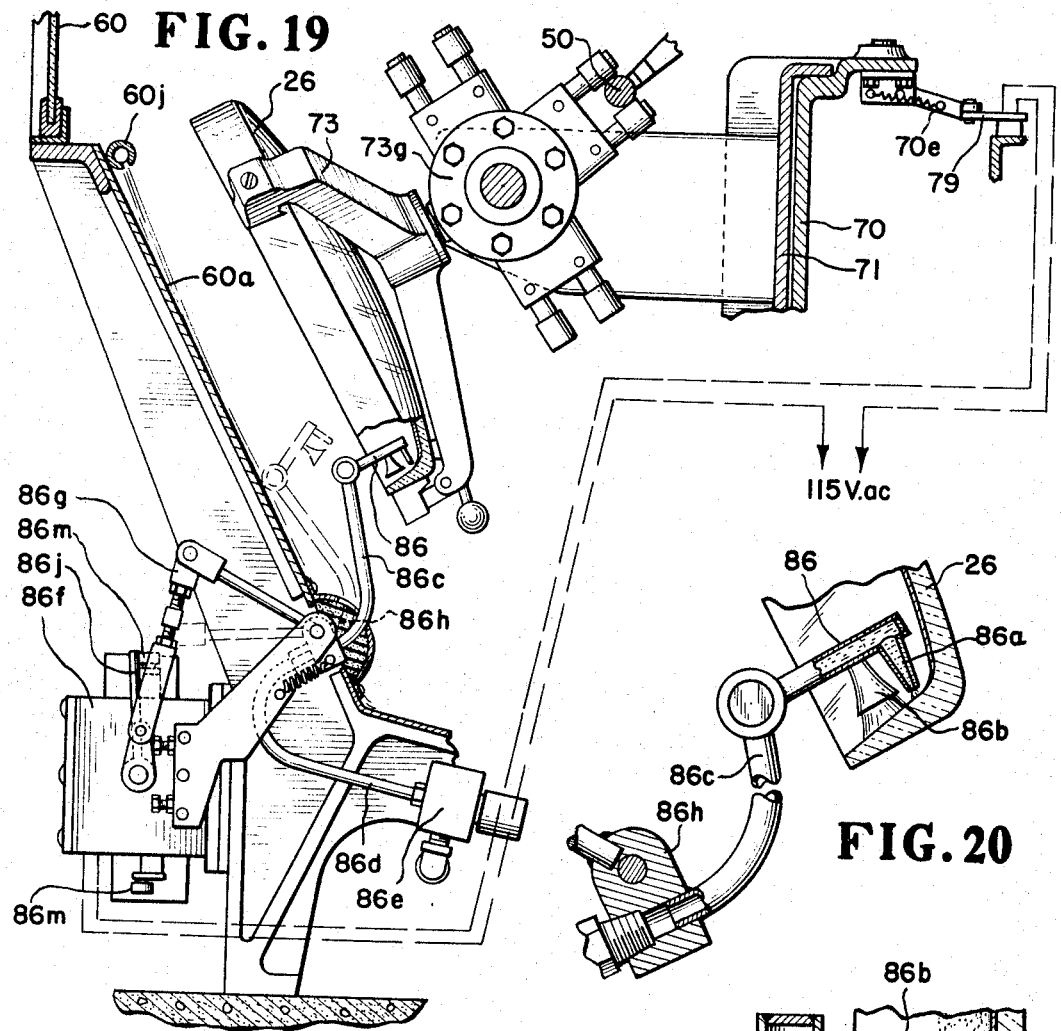
FIGURES 19–22 are details of the trim and drying stations.

The slurry charge deposited in the dispensing station is much more than required for covering the screening area of tube cap 26; the amount is chosen in relation to the speed of rotation and tilt angle of the cap to acquire a uniform coating over the entire screen area comfortably within the index interval which as a practical matter means that there is an excess of slurry to be removed. This removal is termed reclaiming and details of the reclaiming apparatus are disclosed in FIGURES 16-18.

Figure 16:
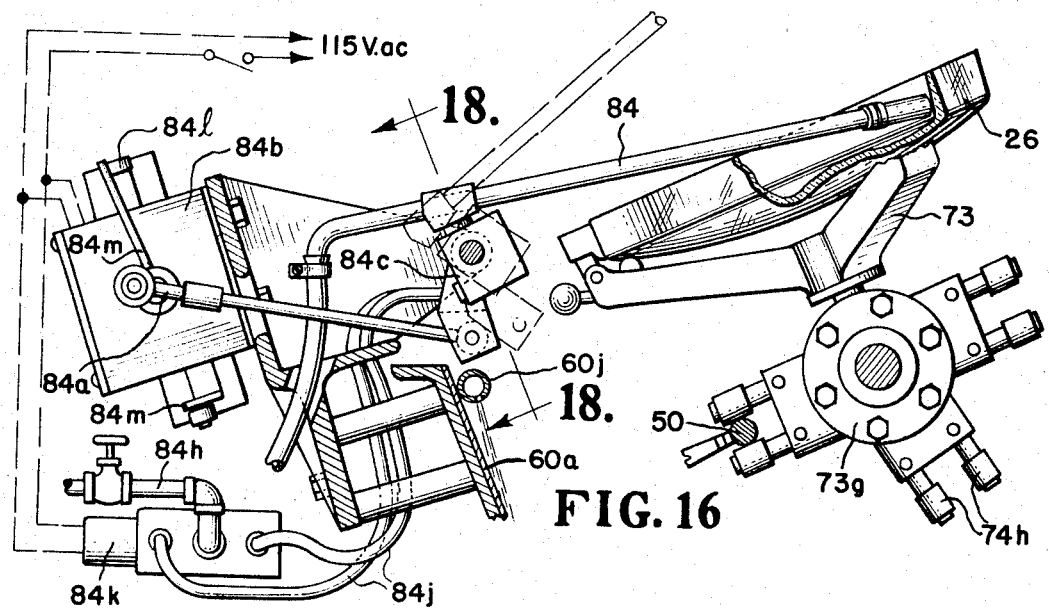
FIGURES 16–18 show details of the slurry reclaim station.

Excess slurry is removed through a hollow probe 84 which is normally kept in the elevated position shown in broken-construction lines in FIGURE 16 out of the path of travel of the workholders. It may be lowered to its reclaim position by a crank 84a driven from an actuator or motor 84b. The crank is coupled to probe 84 through a pivoted housing 84c. Within this housing there is a hydraulic cylinder 84d, the piston rod of which may engage an eccentric lever 84e which is mounted on a rotatable pivot shaft 84f biased toward a rest position by a spring 84g. Pivot shaft 84f is parallel to the axis of rotation of workholder 73 and mechanically coupled to the arm of probe 84. Line 84h is a fluid supply for cylinder 84d, being coupled thereto through conduits 84j. Fluid flow is under the control of an electrically actuated valve 84k. The operation of this valve is controlled by microswitches 84-1 and 84m which may be actuated by rod 84n rotating with crank 84a.

In operation, the workholder will have been established as to tilt and speed of rotation when the screening cart has come to rest in the reclaim station. The microswitch closed by the flag of that cart energizes motor 84b to drive crank 84a and lower the probe into cap 86. At this time the piston of cylinder 84d is in engagement with lever 84e, holding it against the force of spring 84g to position probe 84 radially inward of the skirt of the screen section being processed. This causes the probe to be clear of the mask mounting studs which project inwardly of that skirt. When the probe has been lowered, rod 84n closes microswitch 84-1 to actuate valve 84k and admit fluid into cylinder 84d. As the piston moves to the left (FIGURE 18) spring 84g is permitted to displace the probe toward the periphery of cap 26, positioning it close to the meeting plane of the spherical section and the peripheral flange of the cap, slightly clear of the screen surface. The probe is now free to follow the periphery of the screen section.

Closure of microswitch 84-1 also energizes a process timer which may, if desired, increase the speed of rotation of the workholder by increasing the voltage on the distribution system instantaneously energizing the driving motor of that screen cart. Rotation of the cap at high speed permits the probe to remove excess slurry under the influence of centrifugal force and gravity. After a chosen reclaim time, the process timer causes a second actuation of valve 84k to return the piston of cylinder 84d to the right so that its piston displaces lever 84e and moves the probe toward the center of cap 86. A microswitch (not shown) included in housing 84c is closed in response to the movement of a piston within cylinder 84d to energize actuator 84b which lifts probe 84, removing it from within cap 86. When the probe has been restored to its rest position, rod 84n contacts microswitch 84m to permit continued indexing of the screening conveyor.

Trim and dry stations

In view of the tilt angle of the workholder in the dispensing and reclaiming stations slurry is unavoidably deposited on the peripheral flange of tube cap 26. This is removed to a large extent in the trim and dry station (FIGURES 19-22). The trimming is accomplished by water through a head 86 which has a trim jet outlet 86a and a flushing outlet 86b, outlets 86a and 86b being fan-shaped and arranged normal to one another to provide flat sheet water sprays.

The trim head is supported on a conduit 86c which is in communication with a water supply through a line 86d and a valve 86e. The trim head is displaceable from a rest position shown in broken-construction lines in FIGURE 19 to a trimming position which is the full-line representation of that figure. Movement of the head is under the control of a motor or actuator 86f which drives a crank 86g coupled to the pivoted support 86h of the conduit 86c. As with the other automated apparatus, a rod 86j rotates with the crank to actuate microswitches 86m and 86n.

Figure 20:
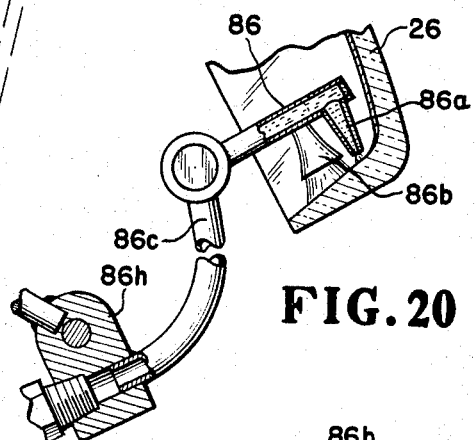

When the workholder enters the trim and dry station L from reclaim station K, its tilt angle and rotational speed will have been adjusted through the tilt rails and power distribution rails as described in connection with the other stations. Flag 70e of the screening cart actuates microswitch 79 of the trim and dry station to energize motor 86f. Through crank 86g, the trim head is caused to enter the cap with the trim jet 86a approximately at the fillet or transition from the flange to the spherical screen as indicated in FIGURE 20. At this time, rod 86d closes microswitch 86m and energizes its process timer. Initially, motor 86f is deenergized while valve 86e operates to establish a stream as well as a flushing spray directed at the periphery of the rotating cap. The action of the water trims the slurry at the level 86p of FIGURE 22 and the slurry from this line to the outer periphery of this flange is washed off. The wash is accomplished by a gentle spray because if the water were to splash onto the phosphor deposit it would probably destroy the screen. It should be noted in passing that the remainder of the slurry on the fillet of the cap is removed in the development stations of the screening conveyors at the time excess slurry is removed subsequent to exposure.

After the process interval has elapsed and trimming has been accomplished, valve 86e is again operated to interrupt the water supply and motor 86f is reenergized to restore the trim head to its rest position by displacing crank 86g. When the trim head has been returned, rod 86j closes microswitch 86n and indexing resumes.

Figure 21:
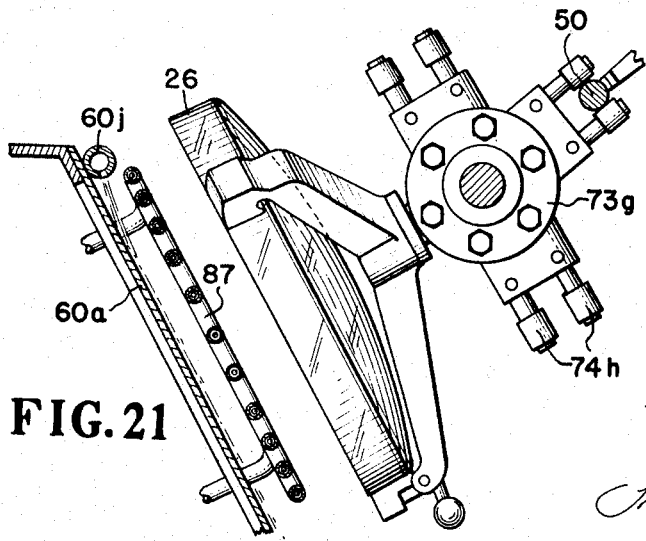
Figure 22:
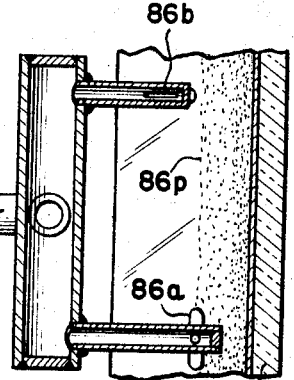

A representative drying device 87 is indicated in FIGURE 21. It may be a panel of calrod elements or infra-red heaters and the workholder is tilted to have the cap 26 face the heater for more efficient drying. Similar heaters are included in the trim stations and in all of the drying stations.

Exposure conveyor

Structural details of the exposure conveyor 32 are given in FIGURES 23-26, inclusive. The conveyor has a base frame 90 which supports a stationary hollow cylindrical member 90a serving as a hub about which the conveyor rotates. The rotating structure is similar to that of a spoked wheel with each radial spoke having an upper structural member 90b and a parallel lower structural member 90c with interconnecting vertical supports 90d, and an exposure cart 91 to be described more particularly in relation to FIGURE 24 is removably suspended from the free-end of each such spoke. The various services required for the carts are supplied through the central structure 90a of the merry-go-round.

The electrical supply 90e terminates in a commutator 90f in the uppermost portion of center member 90a. One or more brush assemblies 90g constitute power take-off devices which may feed through a service box 90h to a distribution line 90j. Each cart fed from such line derives its power through a service box 90k which has a power switch.

The light source of the exposure device is an arc lamp energized by 1000 volts A.C. derived from a power supply 90-1. This power supply is energized through service box 90k and a pressure switch 90m which completes the power supply only when a high pressure air supply to the exposure cart has its rated pressure.

The air intake 90n is also delivered through central column 90a to a manifold 90p which feeds lines 90q leading to the individual lighthouses. The return line 90r also terminates in the hub of the conveyor and the air system may be a closed one.

It is necessary to cool the individual exposure tables and for that reason a trough 90s is constructed in the base of the conveyor frame. A pump 90w mechanically supported by one of the spokes 90c extends into the water supply maintained in the trough and delivers cooling water to a manifold 90u from which lines 90t extend to the exposure tables. The return lines 90v empty into trough 90s. Fresh water of a controlled temperature is constantly added to maintain the reservoir at a desired temperature. Of course, a drain or overflow must be provided to accommodate the continuous flow.

The drive for the merry-go-round includes a motor 90x and a gear system 90y.

The operation of the conveyor itself is most simple. It is continuously rotated at a constant speed to transport a tube cap 26 from its loading station Q to its discharge station R. Throughout the travel time, or so much of it as is required, the cap is subject to exposure from the light in the exposure cart, the exposure being through the mask assigned to that cap. The travel time from load to discharge stations is at least equal to, and preferably greater than, the time required to accomplish complete exposure of the photosensitive resist of the coating on the cap. Throughout the travel, the exposure table has uninterrupted service of power, high pressure air and cooling water. If the travel time of the exposure cart is less than the desired exposure time, the front exposure from below may be supplemented by back exposure from a light source positioned above cap 26. One process involving both front and back exposures is described in a concurrently filed application of Sam H. Kaplan, Serial No. 391,984 now U.S. Patent No. 3,287,130 issued November 22, 1966.

*Exposure table*

Figure 26:
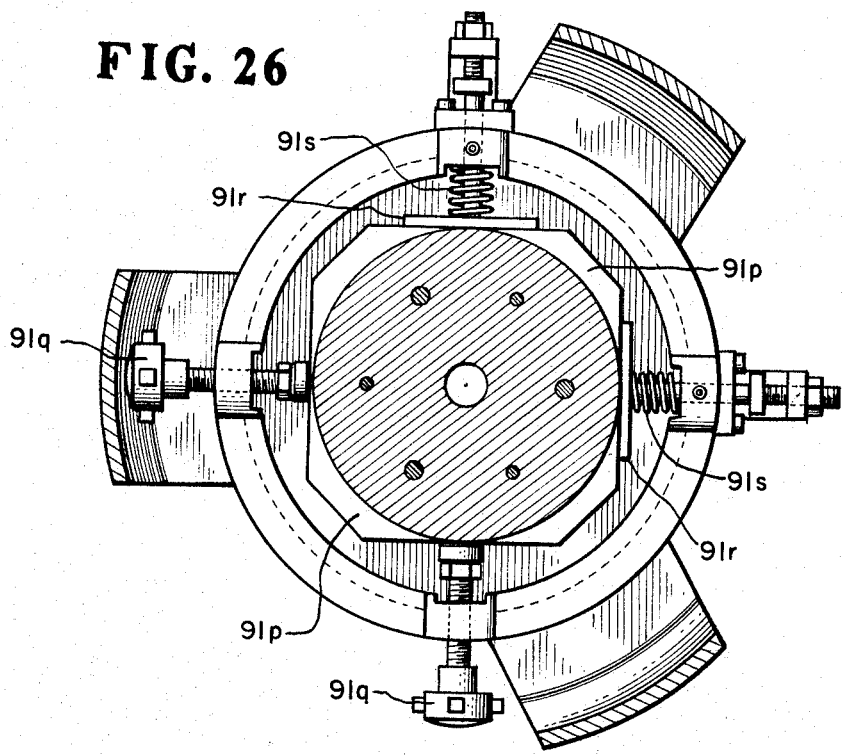

Details of the individual exposure tables are disclosed in FIGURES 24–26. It is seen that each table has a frame or housing 91a which encloses the light source and its accessories. The top of frame 90a has a large aperture 91b and indexing devices which support cap 26 with its enclosed mask 25 in position for the exposure.

The light source 91c is a combination of a linear arc lamp and a semi-cylindrical reflector directing light to a collimator 91d. The collimator in turn directs the light through a lens 91e to the mask 25. A suitable lens is described and claimed in Patent 3,003,874, issued on October 10, 1964 to Sam H. Kaplan.

Normally, lamp 91c is energized continuously and control of the exposure is by means of a shutter 91f which may be opened by means of a solenoid 91g. The operating time of the shutter is controlled by the timer 91h accessible in the front panel of the lighthouse table and having a timing adjustment or control 91j. The timing may be initiated automatically as the exposure table leaves the loading position or there may be a manual control 91k actuated by the operator after the cap has been placed in position.

The high pressure air line 90q has a nozzle termination 91–1 which directs the air jet to the lamp for cooling. There is a housing 91m about the light source and it has a water jacket to which the water lines 90t and 90v connect. It is convenient to provide a door 92 shown in FIGURE 25 to permit ready access to the lighthouse chamber and it is also desirable to have the door panel water cooled as illustrated. The cooling water eliminates the chimney effect so the screens retain a uniform moisture content. A slidable pin 92a is mounted in the housing of the lamp and spring pressed radially inwardly. When lamp 91c is in position, it forces pin 92a radially outwardly, indicating the presence of the lamp.

It is necessary accurately to position the light source assembly transversely of the longitudinal axis of the exposure table. Its position may be adjusted by pairs of adjustable plates 91n and 91p which have pin connection to the lamp housing. Each of these has a pair of adjustment knobs 91q which may advance the plate against a pair of spring backed plates 91r, and transversely of the longitudinal axis of the table. Each plate 91r is backed by a spring 91s which rests against a stationary part of the exposure table. The adjustments of each such plate are in mutual perpendicular relation as shown in FIGURE 26. It is desirable to be able to adjust the distance of the light source from cap 26 and for that reason the table has a threaded sleeve 93 and a crank 93a for rotating it. On the one hand, this sleeve is mechanically coupled to a hollow post 93b depending axially from the light assembly and is in engagement with a threaded section 93c of the lighthouse frame 91a. Rotation of sleeve 93 will advance or retract the light source from cap 26. A lock screw is provided to secure these parts against relative movement after the distance adjustment has been made.

The operation of a single exposure table is quite simple once the position of light source 91c has been properly established. In addition to accurately adjusting its spacing from the cap and screen assembly, it is essential that the light source be accurately positioned transversely of its housing to simulate the position within the completed tube of the electron gun that is to excite a particular family of phosphor dots that are to be formed through the exposure process of the particular table. This is simply a setup procedure and once achieved it is only necessary to load and unload the cap-screen assembly and to press the start switch 91k after the loading has been completed.

When the start switch has been closed, timer 91h is energized and shutter 91f is opened to start the exposure. At the end of the preset exposure time, the timer replaces the shutter and terminates the exposure. Throughout this interval, the air and the water services are maintained for cooling.

*Intermix*

It is highly desirable that the screening apparatus lend itself to the processing of an intermixture of tubes which may have different sizes and/or different configurations. The described plant has that attribute. By way of illustration, one may expect to have to deal with round or rectangular tubes of different screen dimensions. It may be necessary to have alternate sets of workholders dimensioned and/or shaped to accept particular ones of this variety of tubes. Since the workholding frame 73 of the screening cart is readily removable from the cart, the workholder may be changed, if necessary, to accommodate the tube to be processed.

Where the tube shape changes or where the size changes, it may necessitate specific changes in the processing of one or several of the automated work stations of the screening conveyors. By having two or more rather than a single process timer at any such station, it is a simple matter to have the process controlled by the screening cart to determine the specifications of the function carried on at the work station. Accordingly, carriage frame support plate 70 of the screening cart is provided with a process selecting lever 70p (FIGURE 7). It has three positions to which it may be placed; these are designated 70q, 70r and 70s. In each such position, a flag 70t on the chain side of support plate 70 is moved to a specifically different location corresponding to the level of process selector switches that may be provided in any station in which the program is to be modified to accommodate a change in tube size or configuration. The location of selector 70p then causes actuation of the appropriate process switch assuming that the selector has been adjusted properly to reflect the character of the tube under process.

Figure 27:
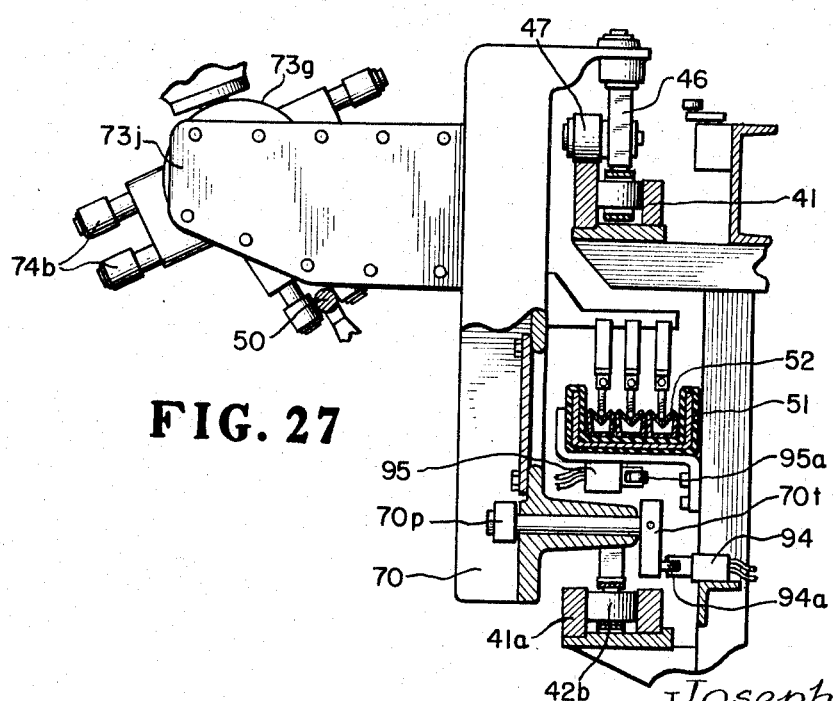
FIGURE 27 is a detail view pertaining to intermix tube processing.

FIGURE 27 shows an arrangement in which there are a pair of microswitches 94, 95 each of which has a roller-type actuator 94a, 95a. Switch 94 is positioned at such a level on the frame of the screening conveyor that it is engaged by flag 70t when selector 70p is in position 70q. The level of switch 95 is such that it is engaged and actuated by flag 70t when selector 70p is in position 70s. For the remaining position 70r of the selector, flag 70t is disposed horizontally between the locations of switches 94 and 95.

In using this mechanism, a work station has a first process timer that is normally effective to control the functions of that station and it accomplishes its task whenever selector 70p is in position 70r. If the tube to be screened requires a change in work process, selector 70p is adjusted to one of its remaining positions 70q and 70s, the one assigned to the particular tube size or configuration in question. Having adjusted the selector, when the screen cart enters a work station for which a process change is to be made, the flag actuates the appropriate one of switches 94, 95 which may either modify the timing of the first mentioned process timer or disable that one and render effective a second process timer having a program schedule required for the tube instantaneously at that station.

The change in programming is made on an individual cart basis because each screen cart has a process selecting provision. Accordingly, it is entirely possible to have an intermixture of a variety of tubes. It is then necessary to correlate the stations of the screening conveyors and the stations of the merry-go-rounds so that the proper exposure table is presented at loading station Q of a merry-go-round at the time it is to be loaded from the discharge station of a screening conveyor. If the number of stations on the screening conveyor is divisble by the number of tube varieties to be processed and if the number of exposure tables on the merry-go-rounds is, likewise, an integral multiple of the number of tube varieties, the programming of these conveyors may be properly correlated. The screening cart accommodating a 25-inch rectangular tube, for example, may be discharged in proper time sequence to the presentation at loading station Q of the merry-go-round of a lighthouse set up for the exposure of that particular tube type.

In addition to the flexibility of intermixing, the described structure has distinct advantages with respect to freedom from contamination. The continuous air wash or curtain enveloping the automated stations contributes materially to this freedom. The provision of separate driving motors on the screening carts for the workholders, as distinguished from friction or other drives coupled to a common driving source, also minimizes the sources of contaminations. The motors on the screening carts are sealed within the housings, providing a dirt-free and positive drive for the workholders.

Another outstanding advantage of the described arrangement is the efficient use of operators. There is a minimum requirement of operating personnel.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. Apparatus for applying a phosphor coating to the screen section of a color television tube comprising:
   a first endless conveyor having a series of workholders for individually supporting a screen section of a color television tube and for transporting said screen section from a loading station through a multiplicity of screen processing stations to a discharge station;
   coating apparatus at one of said processing stations for depositing on said screen section a coating of photosensitive material and phosphor material;
   a second endless conveyor having a series of light exposure housings for individually supporting and selectively exposing predetermined portions of said coating on said screen section while transporting said screen section from a loading station in close proximity to said discharge station of said first conveyor to a discharge station of said second conveyor;
   a third endless conveyor having a series of workholders for individually supporting said screen section and for transporting said screen section from a loading station in close proximity to said discharge station of said second conveyor through a multiplicity of screen processing stations to a discharge station of said third conveyor;
   and apparatus in at least one of said processing stations of said third conveyor for removing unexposed portions of said coating of said screen section.

2. Apparatus for applying a phosphor coating to the screen section of a color television tube comprising:
   a first endless conveyor having a series of workholders for individually supporting a screen section of a color television tube and for transporting said screen section from a loading station through a multiplicity of enclosed screen processing stations to a discharge station;
   coating apparatus at a predetermined one of said enclosed processing stations for depositing on said screen section a wet coating of photosensitive material and phosphor material;
   drying apparatus at one of said enclosed processing stations subsequent to said predetermined station for drying said coating on said screen section;
   a second endless conveyor having a series of light exposure housings for individually supporting and selectively exposing predetermined portions of said coating on said screen section while transporting said screen section from a loading station in close proximity to said discharge station of said first conveyor to a discharge station of said second conveyor;
   a third endless conveyor having a series of workholders for individual supporting said screen section and for transporting said screen section from a loading station in close proximity to said discharge station of said second conveyor through a multiplicity of screen processing stations to a discharge station of said third conveyor;
   and apparatus in at least one of said processing stations of said third conveyor for removing unexposed portions of said coating of said screen section.

3. Apparatus for applying a phosphor coating to the screen section of a color television tube comprising:
   a first endless conveyor in the form of a closed loop having a series of workholders for individually supporting a screen section of a color television tube and for transporting said screen section from a loading station located at one end of said loop through a multiplicity of screen processing stations disposed seriatim along said loop to a discharge station also located at said one end of said loop;
   coating apparatus at one of said processing stations for depositing on said screen section a coating of photosensitive material and phosphor material;
   a second endless conveyor having a series of light exposure housings for individually supporting and selectively exposing predetermined portions of said coating on said screen section while transporting said screen section from a loading station in close proximity to said discharge station of said first conveyor to a discharge station of said second conveyor;
   a third endless conveyor having a series of workholders for individually supporting said screen section and for transporting said screen section from a loading station in close proximity to said dicharge station of said second conveyor through a multiplicity of screen processing stations to a discharge station of said third conveyor;
   and apparatus in at least one of said processing stations of said third conveyor for removing unexposed portions of said coating of said screen section.

4. Apparatus for applying a phosphor coating to the screen section of a color television tube comprising:
   a first endless conveyor in the form of a closed loop having exposed end portions and enclosed portions on opposite side of said loop between said end portions;
   a series of workholders secured to said conveyor for for individually supporting a screen section of a color television tube and for transporting said screen section from a loading station located at one of said exposed end portions of said loop through a multiplicity of screen processing stations disposed within said enclosed portions of said loop to a discharge station also located at said one end portion of said loop;
   coating apparatus at one of said processing stations for depositing on said screen section a coating of photosensitive material and phosphor material;

a second endless conveyor having a series of light exposure housings for individually supporting and selectively exposing predetermined portions of said coating on said screen section while transporting said screen section from a loading station in close proximity to said discharge station of said first conveyor to a discharge station of said second conveyor;

a third endless conveyor having a series of workholders for individually supporting said screen section and for transporting said screen section from a loading station in close proximity to said discharge station of said second conveyor through a multiplicity of screen processing stations to a discharge station of said third conveyor;

and apparatus in at least one of said processing stations of said third conveyor for removing unexposed portions of said coating of said screen section.

5. Apparatus for applying a phosphor coating to the screen section of a color television tube comprising:

a first endless conveyor in the form of a closed loop having exposed end portions and enclosed portions on opposite sides of said loop between said end portions;

a series of workholders secured to said conveyor for individually supporting a screen section of a color television tube and for transporting said screen section from a loading station located at one of said exposed end portions of said loop through a multiplicity of screen processing stations disposed within said enclosed portions of said loop to a discharge station also located at said one end portion of said loop;

a work inspection station located at the other of said exposed end portions of said loop;

coating apparatus at one of said processing stations for depositing on said screen section a coating of photosensitive material and phosphor material;

a second endless conveyor having a series of light exposure housings for individually supporting and selectively exposing predetermined portions of said coating on said screen section while transporting said screen section from a loading station in close proximity to said discharge station of said first conveyor to a discharge station of said second conveyor;

a third endless conveyor having a series of workholders for individually supporting said screen section and for transporting said screen section from a loading station in close proximity to said discharge station of said second conveyor through a multiplicity of screen processing stations to a discharge station of said thrid conveyor;

and apparatus in at least one of said processing stations of said third conveyor for removing unexposed portions of said coating of said screen section.

6. Apparatus for applying a phosphor coating to the screen section of a color television tube comprising:

a first endless conveyor in the form of a closed loop having a series of workholders for individually supporting a screen section of a color television tube and for transporting said screen section from a loading station located at one end of said loop through a multiplicity of screen processing stations disposed seriatim along said loop to a discharge station also located at said one end of said loop;

coating apparatus at one of said processing stations for depositing on said screen section a coating of photosensitive material and phosphor material;

a second endless conveyor also in the form of a closed loop with one end portion adjacent said one end of said first conveyor, said second conveyor having a series of light exposure housings for individually supporting and selectively exposing predetermined portions of said coating on said screen section while transporting said screen section from a loading station at said end portion of said second conveyor to a discharge station also at said end portion of said second conveyor;

a third endless conveyor having a series of workholders for individually supporting said screen section and for transporting said screen section from a loading station in close proximity to said discharge station of said second conveyor through a multiplicity of screen processing stations to a discharge station of said third conveyor;

and apparatus in at least one of said processing stations of said third conveyor for removing unexposed portions of said coating of said screen section.

7. Apparatus for applying a phosphor coating to the screen section of a color television tube comprising:

a first endless conveyor in the form of a closed loop having a series of workholders for individually supporting a screen section of a color television tube and for transporting said screen section in one direction from a loading station located at one end of said loop through a multiplicity of screen processing stations disposed seriatim along said loop to a discharge station also located at said one end of said loop;

coating apparatus at one of said processing stations for depositing on said screen section a coating of photosensitive material and phosphor material;

a second endless conveyor also in the form of a closed loop with one end portion adjacent said one end of said first conveyor, said second conveyor having a series of light exposure housings for individually supporting and selectively exposing predetermined portions of said coating on said screen section while transporting said screen section in a direction opposite to the transport direction of said first conveyor from a loading station at said end portion of said second conveyor to a discharge station also at said end portion of said second conveyor;

a third endless conveyor having a series of workholders for individually supporting said screen section and for transporting said screen section from a loading station in close proximity to said discharge station of said second conveyor through a multiplicity of screen processing stations to a discharge station of said third conveyor;

and apparatus in at least one of said processing stations of said third conveyor for removing unexposed portions of said coating of said screen section.

8. Apparatus for applying a phosphor coating to the screen section of a color television tube comprising:

a first endless conveyor in the form of a closed loop having a series of workholders for individually supporting a screen section of a color television tube and for transporting said screen section from a loading station located at one end of said loop through a multiplicity of screen processing stations disposed seriatim along said loop to a discharge station also located at said one end of said loop;

coating apparatus at one of said processing stations for depositing on said screen section a coating of photosensitive material and phosphor material having a predetermined development interval;

a second endless conveyor also in the form of a closed loop with one end portion adjacent said one end of said first conveyor, said second conveyor having a series of light exposure housings for individually supporting and selectively exposing predetermined portions of said coating on said screen section while transporting said screen section from a loading station at said end portion of said second conveyor to a discharge station also at said end portion of said second conveyor;

means for driving said second conveyor at such speed that the travel time from its loading to its discharge stations at least equals said predetermined interval;

a third endless conveyor having a series of workholders for individually supporting said screen section and for transporting said screen section from a loading station in close proximity to said discharge station of said second conveyor through a multiplicity of screen processing stations to a discharge station of said third conveyor;

and apparatus in at least one of said processing stations of said third conveyor for removing unexposed portions of said coating of said screen section.

9. Apparatus for applying a phosphor coating to the screen section of a color television tube comprising:

a first endless conveyor in the form of a closed loop having a series of workholders for individually supporting a screen section of a color television tube and for transporting said screen section in one direction from a loading station located at one end of said loop through a multiplicity of screen processing stations disposed seriatim along said loop to a discharge station also located at said one end of said loop;

coating apparatus at one of said processing stations for depositing on said screen section a coating of photosensitive material and phosphor material;

a second endless conveyor also in the form of a closed loop with one end portion adjacent said one end of said first conveyor, said second conveyor having a series of light exposure housings for individually supporting and selectively exposing predetermined portions of said coating on said screen section while transporting said screen section in a direction opposite to the transport direction of said first conveyor from a loading station at said one end portion of said second conveyor to a discharge station also at said end portion of said second conveyor;

a third endless conveyor having the same configuration as and disposed in parallel relation to said first conveyor, said third conveyor having a series of workholders for individually supporting said screen section and for transporting said screen section in said one direction from a loading station in close proximity to said discharge station of said second conveyor through a multiplicity of screen processing stations to a discharge station of said third conveyor;

and apparatus in at least one of said processing stations of said third conveyor for removing unexposed portions of said coating of said screen section.

10. Apparatus for applying a phosphor coating to the screen section of a color television tube comprising:

a first group of at least three similar endless conveyors arranged in parallel relation, each of said conveyors being in the form of a closed elongated loop and having a series of workholders for individually supporting a screen section of a color television tube and for transporting said screen section from a loading station located at one end of said loop through a multiplicity of screen processing stations disposed seriatim along said loop to a discharge station also located at said one end of said loop;

coating apparatus at one of said processing stations of at least two of said conveyors for depositing on said screen section a coating of photosensitive material and phosphor material;

a second group of similar endless conveyors in the form of a closed loops, individually arranged with an end portion disposed between and adjacent said ends of a pair of said conveyor of said first group, each conveyor of said second group having a series of light exposure housings for individually supporting and selectively exposing predetermined portions of said coating on said screen section while transporting said screen section from a loading station in close proximity to a discharge station of one of the conveyor pair associated therewith to discharge station in close proximity to the loading station of the other of said conveyor pair;

and apparatus in at least one of said processing stations of at least two of said conveyors of said first group for removing unexposed portions of said coating of said screen section.

11. Apparatus for applying a phosphor coating to the screen section of a color television tube comprising:

a first endless conveyor having a series of workholders for individually supporting a screen section of a color television tube and for transporting said screen section from a loading station through a multiplicity of screen processing stations to discharge station;

coating apparatus at one of said processing stations for depositing on said screen section a coating of photosensitive material and phosphor material;

a second endless conveyor having a series of light exposure housings for individually supporting and selectively exposing predetermined portions of said coating on said screen section while transporting said screen section from a loading station in close proximity to said discharge station of said first conveyor to a discharge station of said second conveyor;

a third endless conveyor having a series of workholders for individually supporting said screen section and for transporting said screen section from a loading station in close proximity to said discharge station of said second conveyor through a multiplicity of screen processing stations to discharge station of said third conveyor;

apparatus in at least one of said processing stations of said third conveyor for removing unexposed portions of said coating of said screen section;

and motor drives for said conveyors operated to advance the workholders of said first and third conveyors from one station to the next in substantial time coincidence with the advance of a light exposure housing of said second conveyor out of the loading station of said second conveyor.

12. Apparatus for applying a phosphor coating to the screen section of a color television tube comprising:

a first endless conveyor having a series of workholders for individually supporting a screen section of a color television tube and for transporting said screen section from a loading station throughout a multiplicity of screen processing stations to a discharge station;

coating apparatus at one of said processing stations for depositing on said screen section a coating of photosensitive material and phosphor material;

a second endless conveyor having a series of light exposure housings for individually supporting and selectively exposing predetermined portions of said coatings on said screen section while transporting said screen section from a loading station in close proximity to said discharge station of said first conveyor to a discharge station of said second conveyor;

a third endless conveyor having a series of workholders for individually supporting said screen section and for transporting said screen section from a loading station in close proximity to said discharge station of said second conveyor through a multiplicity of screen processing stations to a discharge station of said third conveyor;

apparatus in at least one of said processing stations of said third conveyor for removing unexposed portions of said coating of said screen section;

driving means for advancing the workholders of said first and third conveyors at substantially the same rate and in step-by-step fashion;

and means for continuously driving said second conveyor at a speed to advance a light-exposure housing through the loading station thereof in substantial time coincidence with a single step advance of said first and third conveyors.

13. Apparatus for applying a phosphor coating to the screen stations of a number $n$ of intermixed color television tubes comprising:

a first endless conveyor having a series of workholders for individually supporting a screen section of a color television tube and for transporting said screen processing stations to a discharge station;

coating apparatus at one of said processing stations for depositing on said screen section a coating of photosensitive material and phosphor material;

a second endless conveyor having a series of light exposure housings for individually supporting and selectively exposing predetermined portions of said coating on said screen section while transporting said screen section from a loading station in close proximity to said discharge station of said first conveyor to a discharge station of said second conveyor;

a third endless conveyor having a series of workholders for individually supporting said screen section and for transporting said screen section from a loading station in close proximity to said discharge station of said second conveyor through a multiplicity of screen processing stations to a discharge station of said third conveyor;

and apparatus in at least one of said processing stations of said third conveyor for removing unexposed portions of said coating of said screen section, the number of workholders of said first and third conveyors and the number of exposure housings of said second conveyor each being an integral multiple of $n$.

14. Apparatus for applying a phosphor coating to the screen section of a color television tube comprising:

means for depositing a coating of photosensitive material and phosphor material on said screen section;

a rotary endless conveyor having a series of light exposure housing for individually supporting and selectively exposing predetermined portions of said coating on said screen section while transporting said screen section from a loading station to a discharge station;

a supporting frame for said conveyor including a centrally located, hollow cylindrical member;

a commutator carried by said member;

power leads extending within said member into circuit connection with said commutator;

and a power distribution system connected to said commutator and feeding each of said housings.

15. Apparatus for applying a phosphor coating to the screen section of a color television tube comprising:

means for depositing a coating of photosensitive material and phosphor material on said screen section;

a rotary endless conveyor having a series of light exposure housings for individually supporting and selectively exposing predetermined portions of said coating on said screen section while transporting said screen section from a loading station to a discharge station;

a supporting frame for said conveyor;

a water reservoir surrounding said frame;

a water pump mounted on said rotatable conveyor having an intake extending into said reservoir;

a distribution manifold on said rotatable conveyor fed by said pump;

and feed lines connecting said manifold to said housings and return lines extending from said housings to said reservoir.

16. Apparatus for applying a phosphor coating to the screen section of a color television tube comprising:

means for depositing a coating of photosensitive material and phosphor material on said screen section;

a rotary endless conveyor having a series of light exposure housings for individually supporting and selectively exposing predetermined portions of said coating on said screen section while transporting said screen section from a loading station to a discharge station;

a supporting frame for said conveyor including a centrally located, hollow cylindrical member;

a high pressure air line extending through said member to said housings;

a commutator carried by said member;

power leads extending within said member into circuit connection with said commutator;

and a power distribution system connected to said commutator and feeding each of said housings, said distribution system including at each of said housings a pressure responsive switch for completing the supply to each said housing only in presence of a predetermined pressure in said air line.

References Cited by the Examiner

UNITED STATES PATENTS 3,229,607  1/1966  Battaglia _____ 95—75

NORTON ANSHER, *Primary Examiner.*

RICHARD A. WINTERCORN, *Assistant Examiner.*